(12) United States Patent
Ibaragi et al.

(10) Patent No.: US 11,331,882 B2
(45) Date of Patent: May 17, 2022

(54) METAL/FIBER-REINFORCED RESIN MATERIAL COMPOSITE

(71) Applicant: NIPPON STEEL CORPORATION, Tokyo (JP)

(72) Inventors: Masaharu Ibaragi, Tokyo (JP); Noriyuki Negi, Tokyo (JP); Masafumi Usui, Tokyo (JP); Masako Nakai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/758,265

(22) PCT Filed: Dec. 28, 2018

(86) PCT No.: PCT/JP2018/048613
§ 371 (c)(1),
(2) Date: Apr. 22, 2020

(87) PCT Pub. No.: WO2019/132042
PCT Pub. Date: Jul. 4, 2019

(65) Prior Publication Data
US 2020/0316915 A1    Oct. 8, 2020

(30) Foreign Application Priority Data
Dec. 28, 2017 (JP) .............................. JP2017-254694

(51) Int. Cl.
*B32B 15/14* (2006.01)
*B32B 7/12* (2006.01)
(Continued)

(52) U.S. Cl.
CPC ................ *B32B 15/14* (2013.01); *B32B 7/12* (2013.01); *B32B 15/18* (2013.01); *B32B 15/20* (2013.01);
(Continued)

(58) Field of Classification Search
CPC ........... B32B 15/14; B32B 7/12; B32B 15/18; B32B 15/20; B32B 2255/06;
(Continued)

(56) References Cited

U.S. PATENT DOCUMENTS 6,468,613 B1 * 10/2002 Kitano .................... B32B 33/00
428/35.8
2007/0202255 A1 * 8/2007 Shinoda .................. B32B 15/00
427/255.6

(Continued)

FOREIGN PATENT DOCUMENTS

CN        107936759 A  *  4/2018  ........... C09D 157/02
EP        3 564 029 A1     11/2019
(Continued)

OTHER PUBLICATIONS

Machine Translation of WO 2018/124215 (Year: 2018).*
Tanaka, "Infrared spectroscopic analysis", Journal of the Society of Color Materials, vol. 63, No. 10; 1990, pp. 622-632.

*Primary Examiner* — Humera N. Sheikh
*Assistant Examiner* — John D Schneible
(74) *Attorney, Agent, or Firm* — Birch, Stewart, Kolasch & Birch, LLP

(57) ABSTRACT

[Problem]
To provide a metal/fiber-reinforced resin material composite in which a metal member and a fiber-reinforced resin material are firmly bonded, a light weight and excellent workability are obtained while the strength is enhanced, and the amount of the fiber-reinforced resin material used can be reduced.
[Solution]
A metal/fiber-reinforced resin material composite comprising a metal member, and a first fiber-reinforced resin material having a matrix resin and a reinforcement fiber material, the metal member and the first fiber-reinforced resin mate-
(Continued)

rial being formed into a composite with an adhesive resin layer interposed therebetween, wherein the adhesive resin layer is obtained by solidifying or curing an adhesive resin composition containing at least 50 mass parts of a phenoxy resin (A), and the maximum load of the metal/fiber-reinforced resin material composite is greater than the total load of the maximum load of the metal member alone and the maximum load of the fiber-reinforced resin material alone (i.e., so as to display a "super-law-of-mixture (or law of over-mixture)" that surpasses the law of mixture with respect to the tensile load).

16 Claims, 11 Drawing Sheets

(51) Int. Cl.
  *B32B 15/18* (2006.01)
  *B32B 15/20* (2006.01)
  *B32B 27/28* (2006.01)
  *B32B 15/08* (2006.01)
  *B32B 27/26* (2006.01)

(52) U.S. Cl.
  CPC .............. *B32B 15/08* (2013.01); *B32B 27/26* (2013.01); *B32B 27/285* (2013.01); *B32B 2250/02* (2013.01); *B32B 2250/03* (2013.01); *B32B 2250/04* (2013.01); *B32B 2255/02* (2013.01); *B32B 2255/06* (2013.01); *B32B 2255/205* (2013.01); *B32B 2255/26* (2013.01); *B32B 2260/021* (2013.01); *B32B 2260/023* (2013.01); *B32B 2260/046* (2013.01); *B32B 2307/54* (2013.01); *Y10T 428/12569* (2015.01)

(58) Field of Classification Search
  CPC . B32B 2255/205; B32B 27/26; B32B 27/285; B32B 2250/02; B32B 2250/03; B32B 2250/04; B32B 2255/02; B32B 2255/26; B32B 2260/021; B32B 2260/023; B32B 2260/046; B32B 2307/54; B29C 65/485; B29C 65/5057; B29C 66/45; B29C 66/723; B29C 66/7392; B29C 66/7394; B29C 66/742; B29C 66/7422; B29C 66/74283; Y10T 428/12569
  USPC ........................................................ 428/626
  See application file for complete search history.

(56) References Cited

U.S. PATENT DOCUMENTS

| | | | | |
|---|---|---|---|---|
| 2009/0294057 | A1* | 12/2009 | Liang | C09J 175/04 156/330 |
| 2009/0323300 | A1* | 12/2009 | Fujimoto | H05K 3/386 361/784 |
| 2011/0008644 | A1 | 1/2011 | Naritomi et al. | |
| 2015/0298368 | A1 | 10/2015 | Krahnert et al. | |
| 2015/0321392 | A1 | 11/2015 | Stapperfenne et al. | |
| 2016/0160087 | A1* | 6/2016 | Miller | C09J 7/21 156/330 |
| 2017/0241074 | A1 | 8/2017 | Ono et al. | |
| 2017/0291393 | A1* | 10/2017 | Chang | B29C 45/14311 |
| 2018/0079879 | A1 | 3/2018 | Otsuki et al. | |

FOREIGN PATENT DOCUMENTS

| | | |
|---|---|---|
| JP | 8-277336 A | 10/1996 |
| JP | 2004-249641 A | 9/2004 |
| JP | 2011-240820 A | 12/2011 |
| JP | 2012-92158 A | 5/2012 |
| JP | 2013-40299 A | 2/2013 |
| JP | 2015-212085 A | 11/2015 |
| JP | 2016-3257 A | 1/2016 |
| JP | 5999721 B2 | 9/2016 |
| JP | 2015-536850 A | 12/2016 |
| WO | WO 2009/116484 A1 | 9/2009 |
| WO | WO 2016/152856 A1 | 9/2016 |
| WO | WO 2017/090676 A1 | 6/2017 |
| WO | WO-2019116879 A1 * | 6/2019 ............ B32B 15/08 |

\* cited by examiner

METAL/FIBER-REINFORCED RESIN MATERIAL COMPOSITE

TECHNICAL FIELD

The present invention relates to a metal/fiber-reinforced resin material composite in which a metal member and a fiber-reinforced resin material are laminated and integrated.

BACKGROUND ART

Fiber reinforced plastics (FRP: Fiber Reinforced Plastics) in which reinforcing fibers (eg, glass fibers, carbon fibers, etc.) are contained in a matrix resin to form a composite, are lightweight and have excellent tensile strength and workability. Therefore, they are widely used from the consumer sector to industrial applications. In the automotive industry, the application of FRP to automotive members is being studied, focusing on the lightness, tensile strength, workability, etc. of FRP in order to meet the need for a lighter vehicle body that leads to improved fuel efficiency and other performance.

When the FRP itself is used as an automobile member, there are various problems, for example, as follows. First, at the time of painting or bending, existing equipment such as a painting line or a bending mold provided for a metal member such as a steel material cannot be directly used for FRP. Second, since FRP has low compressive strength, it is difficult to use FRP as it is for an automobile member requiring high compressive strength. Third, since the FRP matrix resin is generally a thermosetting resin such as an epoxy resin and thus has brittleness, there is a possibility of brittle fracture when it is deformed. Fourth, FRP (particularly, Carbon Fiber Reinforced Plastics (CFRP) using carbon fiber as a reinforcing fiber) is expensive, which causes an increase in the cost of automobile members. Fifth, as described above, since a thermosetting resin is used as a matrix resin, the curing time is long and the tact time is long. Therefore, it is not suitable for manufacturing an automobile member requiring a short tact time. Sixth, since FRP using a thermosetting resin as a matrix resin does not plastically deform, it cannot be bent once cured.

In order to solve these problems, recently, a metal member/FRP composite material in which a metal member and FRP are laminated and integrated (composite formation) has been studied. Regarding the first problem as described above, in the case of a metal member/FRP composite material, a metal member such as a steel material can be positioned on the surface of the composite material, so that a coating line or a mold provided for a metal material such as a steel material can be used as it is. Regarding the second problem as described above, the compressive strength of a composite material can be increased by forming a composite of the FRP with a metal member having high compressive strength. Regarding the third problem as described above, by forming a composite with a metal member such as a steel material having ductility, the brittleness of the composite material is reduced and the composite material can be deformed. Regarding the fourth problem as described above, by forming a composite of a low-priced metal member and FRP, the amount of FRP used can be reduced, so that the cost of automobile members can be reduced.

In order to form a composite of a metal member and FRP, it is necessary to bond or adhere the metal member and the FRP. As a bonding method, a method using an epoxy resin-based thermosetting adhesive is generally known.

In addition, in order to solve the problems when using the above FRP for automobile members, recently, use of a thermoplastic resin as a matrix resin of the FRP instead of a thermosetting resin such as an epoxy resin has been studied. Regarding the third problem as described above, since a thermoplastic resin is used as the matrix resin, the FRP can be plastically deformed, and the brittleness can be reduced. Regarding the fifth problem as described above, solidification and softening become easy by using a thermoplastic resin as the matrix resin, so that the tact time can be shortened. Regarding the sixth problem as described above, since the FRP can be plastically deformed as described above, the bending process also becomes easy.

As described above, the above-described problems in the case where the FRP is used as an automobile member can be solved by forming a composite of the metal member and the FRP using a thermoplastic resin as a matrix resin.

Here, regarding the bonding or adhering means between the fiber-reinforced resin material such as FRP and the metal member, technical development has been actively carried out mainly from the viewpoint of strengthening the bonding force between the metal member and the bonding or adhering means.

For example, in Patent Document 1 and Patent Document 2, there has been proposed a technique for improving the bonding strength between a metal member and a CFRP, wherein a bonding surface of the metal member is subjected to surface roughening treatment and then a hard and highly crystalline thermoplastic resin is injection-molded thereon, or an adhesive layer of an epoxy resin is provided on the metal member.

In Patent Document 3, a composite of a reinforcing fiber base material and a metal has been proposed, wherein a bonding surface of a carbon fiber base material with a metal member is impregnated with an adhesive resin such as epoxy-based adhesive resin and the other surface is impregnated with a thermoplastic resin to form a prepreg.

Patent Document 4 proposes a method of manufacturing a sandwich structure using a CFRP molded material using a polyurethane resin matrix with a steel plate. The material of this document utilizes a good moldability of a thermoplastic polyurethane resin and pursues a high strength by forming a thermoset resin by causing a crosslinking reaction of the polyurethane resin by after-cure.

Patent Document 5 discloses that a prepreg is prepared by applying a powder of a phenoxy resin or a resin composition obtained by mixing a crystalline epoxy resin and an acid anhydride as a crosslinking agent to a phenoxy resin onto a reinforcing fiber base material by a powder coating method, and CFRP is prepared by mold curing the prepreg by a hot press.

Patent Document 6 proposes a method of manufacturing a structural component for a vehicle body wherein a composite material composed of a flat carrier material made of a metal and a fiber-reinforced thermoplastic material and a support material made of a thermoplastic material is heated to form a rib structure in the support material, and the carrier material is formed into a three-dimensional component.

Patent Document 7 proposes a fiber-reinforced resin intermediate material which is used by being heated and pressed in a laminated state, in which a reinforcing fiber base material has voids open at its outer surface, and a resin in a powder form is in a semi-impregnated state.

PRIOR ART LITERATURE

Patent Document

Patent Document 1: International Publication No. 2009/116484
Patent Document 2: Japanese Patent Publication (kokai) No. 2011-240620

Patent Document 3: Japanese Patent Publication (kokai) No. 2016-3257

Patent Document 4: Japanese Patent Publication (kokai) No. 2015-212085

Patent Document 5: International Publication No. 2016/152856

Patent Document 6: Japanese Patent Publication (kohyo) No. 2015-536850

Patent Document 7: Japanese Patent No. 5999721

Non-Patent Document

Non-Patent Document 1: Takeyuki Tanaka, Journal of the Society of Color Materials, Vol. 63, No. 10, pp. 622-632, 1990

SUMMARY OF THE INVENTION

Problems to be Solved by the Invention

By the way, when designing a high-strength material in the design of a composite material in which it is made from a metal member and a fiber-reinforced resin material such as FRP, generally, it is necessary that the thickness of the metal member is increased or an amount of the fiber-reinforced resin material having a high strength used is increased to increase the thickness of the layer containing the fiber-reinforced resin material. In some cases, it is necessary to increase the thickness of the adhesive layer in order to bond the thick metal member and the layer containing the fiber-reinforced resin material.

However, when the thickness of the metal member is increased, the resulting weight increases, and the need for light weight may not be satisfied. Further, when the thickness of the layer containing the fiber-reinforced resin material is increased, the workability is reduced, and its cost is increased due to an increase in the amount of the fiber-reinforced resin material used. Accordingly, in a composite material in which it is made from a metal member and a fiber-reinforced resin material such as FRP, there is a trade-off relationship between high strength and light weight, and further technical innovation is required.

In view of the above, the present invention has been made in view of the above problems. It is an object of the present invention to provide a metal/fiber-reinforced resin material composite which has a light weight and excellent workability while firmly bonding the metal member and the fiber-reinforced resin material and improving the strength, which makes it possible to be capable of reducing the amount of a fiber-reinforced resin material used.

Means for Solving the Problems

The present inventors have conducted intensive studies, and as a result, a metal member and a fiber-reinforced resin material are integrated (formed into composite) with a cured product of an adhesive resin composition containing a predetermined amount of a phenoxy resin (A). As a result, the present inventors have found that the above problems can be solved and have completed the present invention.

That is, according to one aspect of the present invention, there is provided a metal/fiber-reinforced resin material composite, comprising a metal member and a first fiber-reinforced resin material, the first fiber-reinforced resin material having a matrix resin and a reinforcing fiber material contained in the matrix resin, wherein the metal member and the first fiber-reinforced resin material are formed into a composite via an adhesive resin layer, wherein the adhesive resin layer comprises a cured product of the adhesive resin composition containing at least 50 parts by mass of a phenoxy resin (A) with respect to 100 parts by mass of resin component, wherein the maximum load of the metal/fiber-reinforced resin material composite exhibits a super-law-of-mixture (law of over-mixture) by surpassing a law of mixture.

As described above, by including the phenoxy resin in the adhesive resin composition, the metal member and the first fiber-reinforced resin material can be firmly bonded. As a result, the metal/fiber-reinforced resin material composite can exhibit an excellent strength against a tensile load even when the thicknesses of the metal member, the fiber-reinforced resin material, and the adhesive resin layer are reduced.

Here, the super-law-of-mixture means that the following Formula (2-2) is satisfied.

$$C > A2 + B \quad (2\text{-}2)$$

In Formula (2-2), the load A2 indicates the tensile load of the metal member alone at break of the metal/fiber-reinforced resin material composite, and the load B is the maximum load of the first fiber-reinforced resin material alone, and the load C is the maximum load of the metal/fiber-reinforced resin material composite.

Here, the super-law-of-mixture which is a ratio of the load C to the total load of the load A2 and the load B may be 1.01 or more, and the super-law-of-mixture may be 1.05 or more.

The total thickness T1 of the metal member and the elastic modulus E1 of the metal member, the total thickness T2 of the first fiber-reinforced resin material and the adhesive resin layer, and the elastic modulus E2 of the first fiber-reinforced resin material and the adhesive resin layer may satisfy the relationship of the following Formula (1).

$$(T1 \times E1)/(T2 \times E2) > 0.3 \quad \text{Formula (1)}$$

In the metal/fiber-reinforced resin material composite, the adhesive resin layer may be a second fiber-reinforced resin material having the cured product as a matrix resin and a reinforcing fiber material contained in the matrix resin.

In the metal/fiber-reinforced resin material composite, the adhesive resin composition may be a crosslinkable adhesive resin composition further comprising a crosslinkable curable resin (B) in a range of 5 parts or more and by mass to 85 parts by mass or less with respect to 100 parts by mass of the phenoxy resin (A), and the cured product may be a cross-linked cured product.

In the metal/fiber-reinforced resin material composite, the thickness of the adhesive resin layer is preferably more than 20 μm.

In the metal/fiber-reinforced resin material composite, the material of the metal member may be a steel material, an iron-based alloy, titanium, or aluminum. The steel material may be a hot-dip galvanized steel sheet, an electro-galvanized steel sheet, or an aluminum-plated steel sheet.

The Effect of the Invention

According to the present invention, as described above, by including a phenoxy resin in the adhesive resin composition, the metal member and the first fiber-reinforced resin material can be firmly bonded. As a result, even if the thicknesses of the metal member, the fiber-reinforced resin material and the adhesive resin layer is reduced, the metal/fiber-reinforced resin material composite exhibits an excellent strength exceeding law of mixture with respect to the tensile load. Therefore, it is possible to provide a metal/filter-reinforced resin material composite which is lightweight and excellent in workability, with reducing the amount of the fiber-reinforced resin material while pursuing to improve the strength of the metal/fiber-reinforced resin material composite.

EMBODIMENTS FOR CARRYING OUT THE INVENTION

Figure 1:
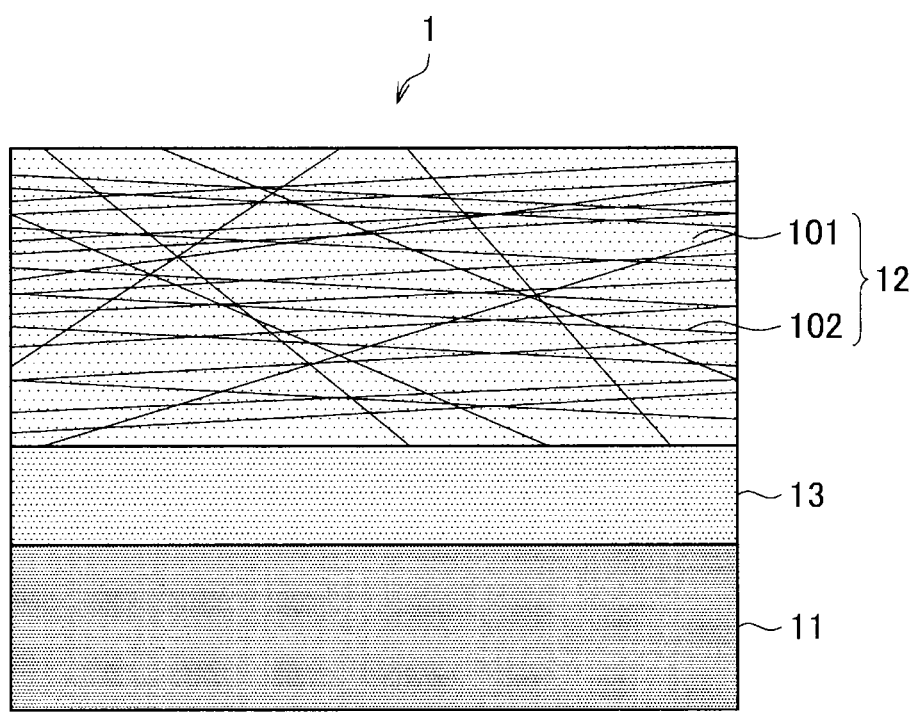
FIG. 1 is a schematic view showing a cross-sectional structure of a metal/fiber-reinforced resin material composite according to a first embodiment of the present invention.

Hereinafter, preferred embodiments of the present invention will be described in detail with reference to the accompanying drawings. In the specification and the drawings, components having substantially the same functional configuration are denoted by the same reference numerals to avoid redundant description.

First Embodiment

[Configuration of Metal/Fiber-Reinforced Resin Material Composite]

Figure 2:
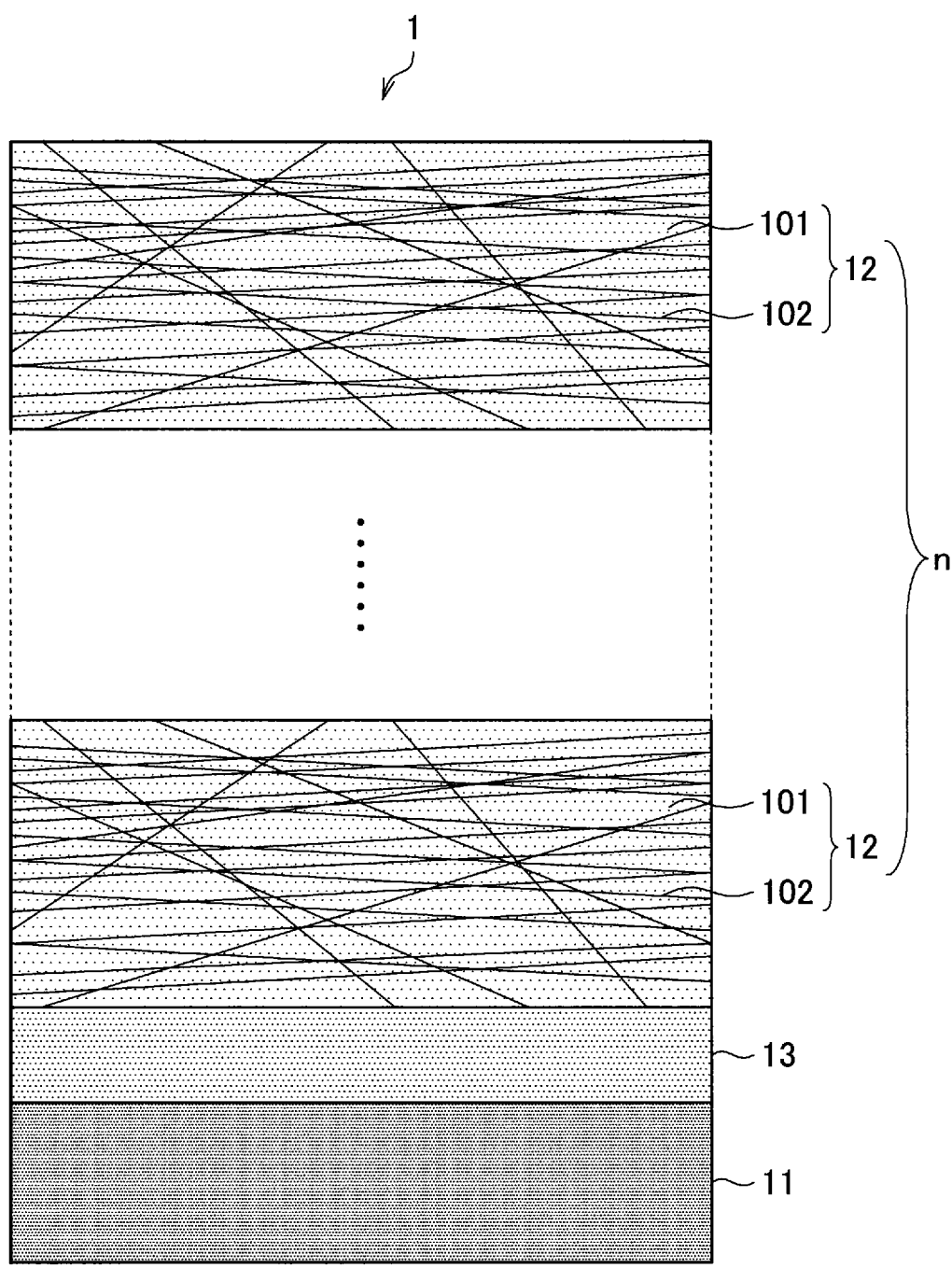
FIG. 2 is a schematic view showing a cross-sectional structure of another aspect of a metal/fiber-reinforced resin material composite according to the same embodiment.

First, the configuration of the metal/fiber-reinforced resin material composite according to the first embodiment of the present invention will be described with reference to FIG. 1 and FIG. 2. FIG. 1 and FIG. 2 are schematic view showing a cross-sectional structure in the stacking direction of a metal/FRP composite 1 as an example of a metal/fiber-reinforced resin material composite according to the present embodiment.

As shown in FIG. 1, the metal/FRP composite 1 includes a metal member 11, an FRP layer 12 as an example of a first fiber-reinforced resin material according to the present embodiment, and an adhesive resin layer 13. The metal member 11 and the FRP layer 12 are formed into a composite via the adhesive resin layer 13. Here, "formed into composite (composite formation)" means that the metal member 11 and the FRP layer 12 (first fiber-reinforced resin material) are bonded (attached) via the adhesive resin layer 13 to be integrated. Also, "integrated" means that the metal member 11, the FRP layer 12 (first fiber-reinforced resin material), and the adhesive resin layer 13 move as a single unit when being processed or deformed.

In the metal/FRP composite 1, the adhesive resin layer 13 is a solidified or cured product of an adhesive resin composition containing 50 parts by mass or more of the phenoxy resin (A) with respect to 100 parts by mass of the resin component, as described later. Incidentally, when simply referred to as "solidified product", it means that a resin component itself has been solidified, and when it is referred to as "cured product", it refers to a resin component which is cured by incorporating various curing agents to the resin component. Incidentally, the curing agent that can be incorporated in the cured product also includes a crosslinking agent as described below, and the "cured product" as described above includes a crosslinked cured product.

In the present embodiment, the adhesive resin layer 13 is provided so as to be in contact with at least one surface of the metal member 11, and firmly bonds the metal member 11 and the FRP layer 12. However, the adhesive resin layer 13 and the FRP layer 12 may be provided not only on one side of the metal member 11 but also on both sides. Further, a laminate including the adhesive resin layer 13 and the FRP layer 12 may be disposed between the two metal members 11.

In the metal/FRP composite 1, it is preferred that the total thickness T1 of the metal member 11 and the elastic modulus E1 of the metal member 11, the total thickness T2 of the FRP layer 12 and the adhesive resin layer 13, and the elastic coefficient E2 of the FRP layer 12 and the adhesive resin 13 satisfies the relationship of the following Formula (1). The elastic modulus in the present embodiment means a tensile modulus (Young's modulus) at room temperature (25° C.). Details of this relationship will be described later.

$$(T1 \times E1)/(T2 \times E2) > 0.3 \quad \text{Formula (1)}$$

Hereinafter, each component of the metal/FRP composite 1 and other configurations will be described in detail.

(Metal Member 11)

The material, shape and thickness of the metal member 11 are not particularly limited as long as they can be formed by pressing or the like, but the shape is preferably a thin plate. Examples of the material for the metal member 11 include, for example, iron, titanium, aluminum, magnesium and alloys thereof. Here, examples of the alloy include, for example, an iron-based alloy (including stainless steel), a Ti-based alloy, an Al-based alloy, and a Mg alloy. The material for the metal member 11 is preferably a steel material, an iron-based alloy, titanium and aluminum, and more preferably a steel material having a higher elastic modulus than other metal types. Examples of such a steel material include steel materials such as cold rolled steel sheets for general use, drawing or ultra deep drawing specified by Japanese Industrial Standards (JIS) as thin sheet steel sheets for automobiles; workable cold-rolled high-tensile steel sheet for automobiles; hot-rolled steel sheet for general and working use; hot-rolled steel sheet for automobile structure; workable hot-rolled high-tensile steel sheet for automobiles. Examples of such a steel material further includes carbon steel, alloy steel, high-tensile steel and the like used for general structural and mechanical structure purposes as steel materials which are not limited to thin plates.

Any surface treatment may be applied to the steel material. Here, the surface treatment includes, for example, various plating treatments such as galvanizing (hot-dip galvanized steel sheet, electrogalvanizing, etc.) and aluminum plating, chemical conversion treatments such as chromate treatment and non-chromate treatment, and physical surface roughening treatment such as sand blasting or chemical surface roughening treatment such as chemical etching, but is not limited thereto. Further, alloying of plating and plural kinds of surface treatments may be performed. As the surface treatment, at least a treatment for the purpose of imparting rust resistance is preferably performed.

In order to enhance the adhesiveness to the FRP layer 12, it is preferable to treat the surface of the metal member 11 with a primer. As a primer used in this treatment, for example, a silane coupling agent or a triazinethiol derivative is preferable. Examples of the silane coupling agent include an epoxy silane coupling agent, an amino silane coupling agent, and an imidazole silane compound. Examples of triazine thiol derivatives include 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithiol-1,3,5-triazine.

Here, depending on the material of the metal member 11, an oil film may be formed on the surface of the metal member 11 from the viewpoint of rust prevention or the like. For example, when the metal member 11 is a hot-dip galvanized steel plate, an electro-galvanized steel plate, or an aluminum-plated steel plate among other steel materials, an oil film made of rust-preventive oil is often formed on the surface of the metal member 11. It is sometimes difficult to bond the FRP and the metal member 11 with a sufficient bonding strength, when an attempt is made to bond the FRP and the metal member 11 with the adhesive resin layer 13 while such an oil film is formed on the surface of the metal member 11. That is, it may be difficult to produce the metal/FRP composite 1 exhibiting the super-law-of-mixture. Therefore, when an oil film is formed on the surface of the metal member 11, it is preferable to perform a degreasing treatment before bonding with the FRP. As a result, the FRP and the metal member 11 can be bonded with a sufficient bonding strength, and the metal/FRP composite 1 can easily obtain a strength exceeding the law of mixture described later. Incidentally, regarding the necessity of degreasing, the intended metal member 11 is bonded and integrated with the intended FRP with the intended adhesive resin composition without a degreasing step in advance to confirm and judge as to whether or not a super-law-of-mixture is actually achieved. The law of mixture and super-law-of-mixture will be described later.

(FRP Layer 12)

The FRP layer 12 has a matrix resin 101 and a reinforcing fiber material 102 contained in the matrix resin 101 to form a composite.

As the matrix resin 101 used for the FRP layer 12, both a thermosetting resin and a thermoplastic resin can be used. Examples of the thermosetting resin include an epoxy resin and a vinyl ester resin. The thermoplastic resin is selected from phenoxy resin, polyolefin and acid-modified products thereof, polystyrene, polymethyl methacrylate, AS resin, ABS resin, polyesters such as polyethylene terephthalate and polybutylene terephthalate, vinyl chloride, acrylic, polycarbonate, polyamide, and super engineering plastics such as polyether sulfone, polyphenylene ether and modified products thereof, polyimide, polyamide imide, polyether imide, polyether ether ketone, polyphenylene sulfide, polyoxymethylene, polyarylate, polyether ketone, polyether ketone ketone, and nylon, and one or more types of the resins can be used.

Among the above resins, it is preferable that the matrix resin 101 is formed of a resin composition exhibiting a good adhesiveness with the phenoxy resin (A) contained in the adhesive resin composition of the adhesive resin layer 13. Examples of the resin exhibiting a good adhesiveness with the phenoxy resin (A) include an epoxy resin, a phenoxy resin, a polyolefin resin modified with an acid such as maleic anhydride, polycarbonate, polyarylate, polyimide, polyamide, and polyether sulfone. These resins include those having a low adhesiveness to the metal member 11, but can be indirectly bonded to the metal member 11 by interposing the adhesive resin layer 13.

Here, when a thermosetting resin is used as the matrix resin 101, there are problems such as brittleness of the FRP layer 12, long tact time, and inability to perform bending, as described above. From the viewpoint of solving such problems, it is preferable to use a thermoplastic resin as the matrix resin 101. However, usually, a thermoplastic resin has a high viscosity when melted, and cannot be impregnated into the reinforcing fiber material 102 in a low viscosity state unlike a thermosetting resin such as an epoxy resin before thermosetting. Therefore, impregnating property to the reinforcing fiber material 102 is poor. As a result, the reinforcing fiber density (VF: Volume Fraction) in the FRP layer 12 cannot be increased unlike the case where a thermosetting resin is used as the matrix resin 101. Taking carbon fiber reinforced plastic (CFRP) using carbon fibers as the reinforcing fiber material 102 as an example, when an epoxy resin is used as the matrix resin 101, VF can be about 60%. However, when a thermoplastic resin such as propylene or nylon is used as the matrix resin 101, the VF becomes about 50%. Here, in order for the FRP to exhibit an excellent tensile strength, it is necessary that the matrix resin 101 is impregnated into the reinforcing fiber material 102 in a state where the fibers constituting the reinforcing fiber material 102 are drawn at a high density and strongly in the same direction. However, it is difficult for the matrix resin 101 to impregnate into the reinforcing fiber material 102 in such a state. If the reinforcing fiber material 102 is not sufficiently impregnated with the matrix resin 101 and a defect such as a void occurs in the FRP, not only does the FRP not show the desired tensile strength, but also the FRP may occur brittle fracture starting from the defect. Therefore, impregnation is very important. In addition, when a thermoplastic resin such as polypropylene or nylon is used, the FRP layer 12 cannot have high heat resistance as when a thermosetting resin such as an epoxy resin is used.

In order to solve the problem when using such a thermoplastic resin, it is preferable to use a phenoxy resin as the matrix resin 101. Since the molecular structure of the phenoxy resin is very similar to that of the epoxy resin, the phenoxy resin has the similar level of heat resistance to the epoxy resin, and has a good adhesiveness to the adhesive resin layer 13 and the metal member 11. Furthermore, a so-called partially cured resin can be obtained by adding a curing component such as an epoxy resin to the phenoxy resin and copolymerizing the same. By using such a partially cured resin as the matrix resin 101, it is possible to obtain a matrix resin that is excellent in impregnation into the reinforcing fiber material 102. Further, by thermally curing the curing component in the partially cured resin, it is possible to prevent the matrix resin 101 in the FRP layer 12 from melting or softening when exposed to a high temperature, as in a normal thermoplastic resin. The amount of the curing component added to the phenoxy resin may be appropriately determined in consideration of the impregnating property to the reinforcing fiber material 102, the brittleness of the FRP layer 12, the tact time, the workability, and the like. As described above, by using a phenoxy resin as the matrix resin 101, it becomes possible to add and control a curing component with a high degree of freedom.

For example, when carbon fiber is used as the reinforcing fiber material 102, a sizing agent that is familiar with an epoxy resin is often applied to the surface of the carbon fiber. Since the structure of the phenoxy resin is very similar to that of the epoxy resin, the sizing agent for the epoxy resin can be used as it is by using the phenoxy resin as the matrix resin 101. Therefore, cost competitiveness can be enhanced.

In the metal/FRP composite 1, the matrix resin 101 of the FRP layer 12 and the resin forming the adhesive resin layer 13 (which will be described in detail later) may be the same resin or different resins. However, from the viewpoint of sufficiently securing the adhesiveness between the FRP layer 12 and the adhesive resin layer 13, a resin that is the same as or the same type as the resin forming the resin constituting the adhesive resin layer 13, or a resin having similar ratio of polar groups contained in the polymer is selected as the matrix resin 101. Here, "the same resins" mean that they include the same components and have the same composition ratios. "the same type of resins" mean that if their main components are the same, their composition ratios may be different. "The same type of resins" include "the same resin". Further, the "main component" means a component contained in an amount of 50 parts by mass or more based on 100 parts by mass of all resin components. The "resin component" includes a thermoplastic resin and a thermosetting resin, but does not include a non-resin component such as a crosslinking agent.

The reinforcing fiber material 102 is not particularly limited, but is preferably, for example, carbon fiber, boron fiber, silicon carbide fiber, glass fiber, aramid fiber, or the like, and more preferably carbon fiber. For the type of carbon fiber, for example, any of PAN-based and pitch-based ones can be used, and may be selected according to the purpose and use. Further, as the reinforcing fiber material 102, one kind of the above-described fiber may be used alone, or a plurality of kinds may be used in combination.

In the FRP used for the FRP layer 12, as the reinforcing fiber base material serving as the base material of the reinforcing fiber material 102, for example, a nonwoven fabric base material using chopped fibers, a cloth material using continuous fibers, and a unidirectional reinforcing fiber base material (UD material) or the like can be used. From the viewpoint of the reinforcing effect, it is preferable to use a cloth material or a UD material as the reinforcing fiber base material.

In the metal/FRP composite 1, the FRP layer 12 is formed using at least one or more FRP molding prepregs. The FRP layer 12 is not limited to one layer, and may be two or more layers, for example, as shown in FIG. 2. The thickness of the FRP layer 12 and the number n of the FRP layers 12 when the FRP layer 12 has a plurality of layers may be appropriately set according to the purpose of use. When there are a plurality of FRP layers 12, each layer may have the same configuration or may be different. That is, the resin type of the matrix resin 101 constituting the FRP layer 12, and the type and content ratio of the reinforcing fiber material 102 may be different from each layer.

(Adhesive Resin Layer 13)

The adhesive resin layer 13 is bonded to the metal member 11 and the FRP layer 12 of the metal/FRP composite 1.

Adhesive Resin Composition

The adhesive resin layer 13 is formed of a solidified or cured product of an adhesive resin composition containing 50 parts by mass or more of the phenoxy resin (A) based on 100 parts by mass of the resin component. That is, 50 parts by mass or more based on 100 parts by mass of the resin component are composed of the phenoxy resin (A). By using such an adhesive resin composition, the metal member 11 and the FRP layer 12 can be firmly bonded. The adhesive resin composition preferably contains 55 parts by mass or more of the phenoxy resin (A) in 100 parts by mass of the resin component. The form of the adhesive resin composition can be, for example, a powder, or a liquid such as a varnish, or a solid such as a film.

The content of the phenoxy resin (A) can be measured using infrared spectroscopy (IR), as described below. When the content ratio of the phenoxy resin is analyzed from the resin composition targeted by IR, it can be measured according to the method disclosed in Non-patent Document 1. Specifically, it can be measured by using a general method of IR analysis such as a transmission method and an ATR reflection method. The following method is a method for analyzing the resin composition in the FRP layer 12, but the similar method can also be applied to the adhesive resin layer 13.

The FRP layer 12 is cut out with a sharp knife or the like, the fibers are removed as much as possible with tweezers or the like, and the resin composition to be analyzed is sampled from the FRP layer 12. In the case of the transmission method, a KBr powder and a powder of the resin composition to be analyzed are crushed while being uniformly mixed in a mortar or the like to form a thin film, which is used as a sample. In the case of the ATR reflection method, a tablet as a sample may be prepared by crushing the powder while uniformly mixing it in a mortar, similarly to the transmission method, or a surface of a single-crystal KBr tablet (for example, 2 mm in diameter×1.8 mm thickness) may be scratched with a file or the like, and the resin composition to be analyzed is dusted and adhered to make a sample. In any method, it is important to measure the background of KBr alone before mixing with the resin to be analyzed. As the IR measuring device, a commercially available general measuring device can be used, but an apparatus having the absorbance in accuracy of 1% unit, and the wavenumber in analysis accuracy of 1 $cm^{-1}$ unit is preferable, and examples thereof include FT/IR-6300 manufactured by JASCO Corporation.

When investigating the content of the phenoxy resin (A), the absorption peaks of the phenoxy resin are as shown in FIGS. 2, 3, 4, 6, and 7 of the above-described Non-Patent Document 1. When only those absorption peaks disclosed in the above-described Non-Patent Document 1 are observed in the measured IR spectrum, it is determined that the composition is composed of only the phenoxy resin.

Figure 3:
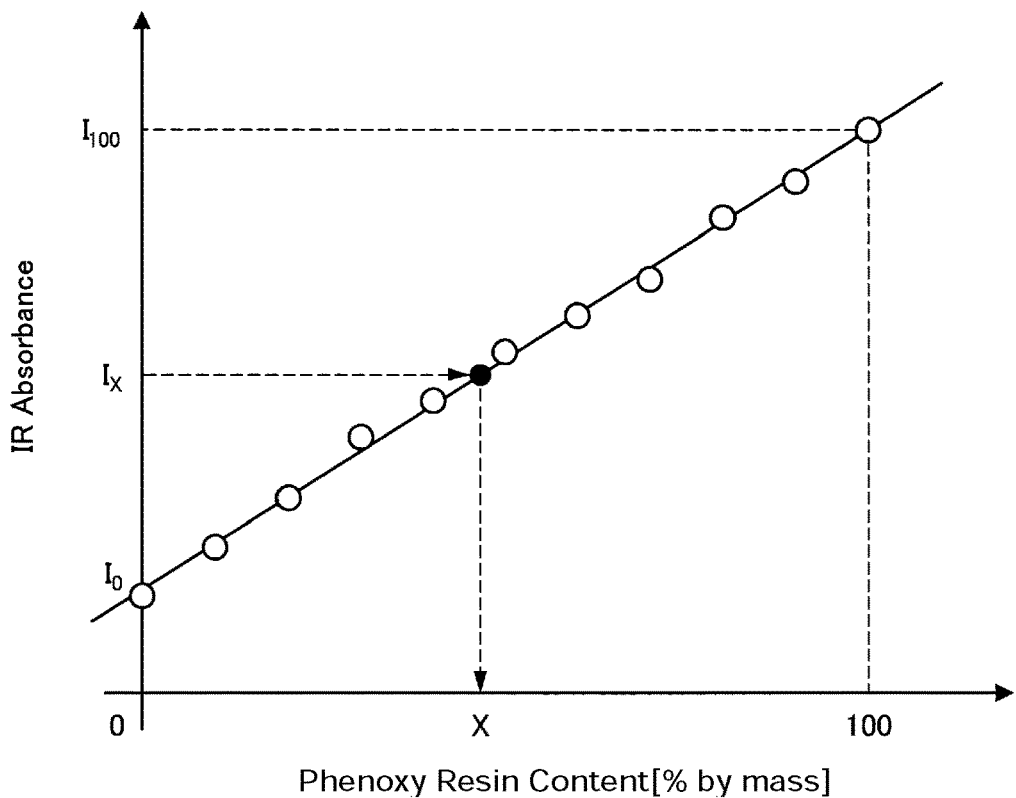
FIG. 3 is an explanatory diagram for describing a method for measuring the content of a phenoxy resin.

On the other hand, when a peak other than the absorption peaks disclosed in the above-described Non-Patent Document 1 is detected, it is determined that the resin composition contains another resin composition, and the content thereof is estimated as follows. The mixing ratios of the powder of the resin composition to be analyzed and the powder of the phenoxy resin composition (for example, Phenotote YP-50S manufactured by Nippon Steel & Sumikin Chemical Co., Ltd.) in a mass ratio of 100:0, 90:10, 80:20, 70:30, 60:40, 50:50, 40:60, 30:70, 20:80, 10:90 and 0:100 are used to analyzed by IR analysis, and the change in the intensity of the peak (eg, 1450-1480 cm$^{-1}$, near 1500 cm$^{-1}$, near 1600 cm$^{-1}$, etc.) is recorded. Based on the obtained change in intensity, a calibration curve is created as shown in FIG. 3. By using the obtained calibration curve, the phenoxy resin content of a sample whose phenoxy resin content is unknown can be determined.

Specifically, if the phenoxy content of the resin composition to be analyzed is X %, X % can be estimated from the change in strength when the content of the phenoxy resin is varied from X % to 100%. That is, when measured at the above mixing ratio, the content of the phenoxy resin varies from X, 0.9X+10, 0.8X+20, 0.7X+30 ... 0.2X+80, 0.1X+90 to 100%. A graph having a horizontal axis representing the content and a vertical axis representing the absorbance peak intensity is made by plotting points, and a straight line connecting each point can be drawn on the graph. Here, if the intensity at the content of 100% is $I_{100}$, the intensity at the content of X % is $I_X$, and the intensity at the content of 0%, that is, Y intercept of the graph is $I_0$, then $(I_X-I_0)/(I_{100}-I_0) \times 100 = X$ %. Accordingly, X can be determined. The reason why the mixing ratios are finely distributed at intervals of 10% is to improve the measurement accuracy.

"Phenoxy resin" is a linear polymer obtained from a condensation reaction between a dihydric phenol compound and epihalohydrin or a polyaddition reaction between a dihydric phenol compound and a bifunctional epoxy resin, and is an amorphous thermoplastic resin. The phenoxy resin (A) can be obtained by a conventionally known method in a solution or without solvent, and can be used in any form of powder, varnish, and film. The average molecular weight of the phenoxy resin (A) is, for example, in the range of 10,000 or more and 200,000 or less as a weight average molecular weight (Mw), and preferably in the range of 20,000 or more and 100,000 or less, more preferably in the range of 30,000 or more and 80,000 or less. By setting the Mw of the phenoxy resin (A) to be in the range of 10,000 or more, the strength of the molded article can be increased. This effect is further enhanced by setting the Mw to 20,000 or more, and further to 30,000 or more. On the other hand, by setting the Mw of the phenoxy resin (A) to 200,000 or less, excellent usability and workability can be obtained. This effect is further enhanced by setting the Mw to 100,000 or less, and further to 80,000 or less.

Further, the average molecular weight of the adhesive resin (phenoxy resin (A) and other resin components) constituting the adhesive resin layer 13 is preferably larger than the average molecular weight of the matrix resin 101 of the FRP layer 12. The matrix resin 101 for the FRP layer 12 preferably has a low viscosity at the time of melting in order to increase the impregnation property to the reinforcing fiber base material. Therefore, it is preferable that the molecular weight of the matrix resin 101 is small.

Mw in the present specification is a value measured by gel permeation chromatography (GPC) and converted using a standard polystyrene calibration curve.

The hydroxyl equivalent (g/eq) of the phenoxy resin (A) used in the present embodiment is, for example, in the range of 50 or more and 1,000 or less, preferably in the range of 50 or more and 750 or less, and more preferably in the range of 50 or more and 500 or less. By setting the hydroxyl group equivalent of the phenoxy resin (A) to 50 or more, the number of hydroxyl groups decreases and the water absorption decreases, so that the mechanical properties of the cured product can be improved. On the other hand, by setting the hydroxyl equivalent of the phenoxy resin (A) to 1000 or less, it is possible to suppress a decrease in the number of hydroxyl groups, thereby improving the affinity with the adherend and improving the mechanical properties of the metal/FRP composite 1. This effect is further enhanced by setting the hydroxyl equivalent to 750 or less, or further 500 or less.

The glass transition temperature (Tg) of the phenoxy resin (A) is, for example, preferably in the range of 65° C. or higher and 150° C. or lower, and more preferably in the range of 70° C. or higher and 150° C. or lower. If the Tg is 65° C. or higher, the flowability of the resin can be suppressed from being too large while ensuring the moldability, so that the thickness of the adhesive resin layer 13 can be sufficiently ensured. On the other hand, if the Tg is 150° C. or lower, the melt viscosity becomes low, so that it becomes easy to impregnate the reinforcing fiber base material without defects such as voids, and a lower temperature bonding process can be performed. The Tg of the phenoxy resin (A) in the present specification is a numerical value calculated from a peak value in the second scanning, which is measured using a differential scanning calorimeter at a temperature rise of 10° C./min at a temperature within the range of 20 to 280° C.

The phenoxy resin (A) is not particularly limited as long as it satisfies the above-mentioned physical properties, but is preferably a bisphenol A-type phenoxy resin (for example, available as Phenotote YP-50, Phenotote YP-50S, and Phenotote YP-55U manufactured by Nippon Steel & Sumikin Chemical Co., Ltd.), bisphenol F type phenoxy resin (for example, available as Phenotote FX-316 manufactured by Nippon Steel & Sumikin Chemical Co., Ltd.), phenoxy resin derived from copolymerization of bisphenol A and bisphenol F (e.g., available as YP-70 manufactured by Nippon Steel & Sumikin Chemical Co., Ltd.), and special phenoxy resins such as brominated phenoxy resins, phosphorus-containing phenoxy resins, and sulfone group-containing phenoxy resins other than the phenoxy resins listed above (for example, available as phenothote PB-43C, Phenotote FX293 and YPS-007, etc. manufactured by Nippon Steel & Sumikin Chemical Co., Ltd.) and the like. These resins can be used alone or in a mixture of two or more.

The adhesive resin composition may contain a thermoplastic resin or a thermosetting resin other than the phenoxy resin (A). The type of the thermoplastic resin is not particularly limited. For example, one or more selected from phenoxy resin, polyolefin and acid-modified products thereof, polystyrene, polymethyl methacrylate, AS resin, ABS resin, polyester such as polyethylene terephthalate and polybutylene terephthalate, vinyl chloride, acrylic, polycarbonate, polyamide, super engineering plastics such as polyether sulfone, polyphenylene ether and modified products thereof, polyimide, polyamide imide, polyether imide, polyether ether ketone, polyphenylene sulfide, polyoxymethylene, polyarylate, polyether ketone, polyether ketone ketones and nylons can be used. Further, as the thermosetting resin, for example, one or more selected from an epoxy resin, a vinyl ester resin, a phenol resin, and a urethane resin can be used.

The adhesive resin composition preferably has a melt viscosity of 3,000 Pa·s or less in any temperature range of 160 to 250° C., preferably has a melt viscosity in the range of 90 Pa·s or more and 2,900 Pa·s or less, more preferably has a melt viscosity in the range of 100 Pa·s or more and 2,800 Pa·s or less. By setting the melt viscosity in the temperature range of 160 to 250° C. to 3,000 Pa·s or less, the fluidity at the time of melting is improved, and defects such as voids are less likely to occur in the adhesive resin layer 13. On the other hand, if the melt viscosity is 90 Pa·s or less, the molecular weight of the resin composition is too small, and if the molecular weight is too small, the resin composition becomes brittle and the mechanical strength of the metal/FRP composite 1 decreases.

Crosslinkable Adhesive Resin Composition

A crosslinkable adhesive resin composition (that is, a cured product of the adhesive resin composition) can also be prepared by blending, for example, an acid anhydride, isocyanate, caprolactam, or the like as a crosslinking agent into the adhesive resin composition containing the phenoxy resin (A). Since the heat resistance of the adhesive resin composition is improved by performing a crosslinking reaction using a secondary hydroxyl group contained in the phenoxy resin (A), the crosslinkable adhesive resin composition is advantageous for use in the member used in a higher temperature environment. For crosslinking formation using a secondary hydroxyl group of the phenoxy resin (A), it is preferable to use a crosslinkable adhesive resin composition in which a crosslinkable curable resin (B) and a crosslinking agent (C) are blended. As the crosslinkable curable resin (B), for example, an epoxy resin or the like can be used, but it is not particularly limited. By using such a crosslinkable adhesive resin composition, a cured product in a second cured state (crosslinked cured product) is obtained in which the Tg of the adhesive resin composition is greatly improved as compared with the case of using the phenoxy resin (A) alone. The Tg of the crosslinked cured product of the crosslinkable adhesive resin composition is, for example, 160° C. or higher, preferably 170° C. or higher and 220° C. or lower.

In the crosslinkable adhesive resin composition, as the crosslinkable curable resin (B) mixed with the phenoxy resin (A), an epoxy resin having two or more functionalities is preferable. Bifunctional or higher functional epoxy resins include bisphenol A type epoxy resins (for example, available as Epototo YD-011, Epototo YD-7011 and Epototo YD-900 manufactured by Nippon Steel & Sumikin Chemical Co., Ltd.), bisphenol F type epoxy resins (for example, available as Epototo YDF-2001 manufactured by Nippon Steel & Sumikin Chemical Co., Ltd.), diphenyl ether type epoxy resin (for example, available as YSLV-80DE manufactured by Nippon Steel & Sumikin Chemical Co., Ltd.), tetramethylbisphenol F type epoxy resin (for example, YSLV-80XY manufactured by Nippon Steel & Sumikin Chemical Co., Ltd.), bisphenol sulfide type epoxy resin (for example, available as YSLV-120TE manufactured by Nippon Steel & Sumikin Chemical Co., Ltd.), hydroquinone type epoxy resin (for example, available as Epototo YDC-1312 manufactured by Nippon Steel & Sumikin Chemical Co., Ltd.), phenol novolak type epoxy resin (for example, available as Epototo YDPN-638 manufactured by Nippon Steel & Sumikin Chemical Co., Ltd.), ortho-cresol novolak type epoxy resin (for example, available as Epototo YDCN-701, Epototo YDCN-702, Epototo YDCN-703 and Epototo YDCN-704 manufactured by Nippon Steel & Sumikin Chemical Co., Ltd.), aralkyl naphthalene diol novolak type epoxy resin (for example, available as ESN-355 manufactured by Nippon Steel & Sumikin Chemical Co., Ltd.), and a triphenylmethane type epoxy resin (for example, available as EPPN-502H manufactured by Nippon Kayaku Co., Ltd.), but are not limited thereto. These epoxy resins may be used alone or in a mixture of two or more.

The crosslinkable curable resin (B) is not particularly limited, but is preferably a crystalline epoxy resin, and more preferably, a crystalline epoxy resin having a melting point in the range of 70° C. or higher and 145° C. and lower, and a melt viscosity at 150° C. of 2.0 Pa·s or less. By using a crystalline epoxy resin having such melting properties, the melt viscosity of the crosslinkable adhesive resin composition as the adhesive resin composition can be reduced, and the adhesiveness of the adhesive resin layer 13 can be improved. If the melt viscosity exceeds 2.0 Pa·s, the moldability of the crosslinkable adhesive resin composition may decrease, and the homogeneity of the metal/FRP composite 1 may decrease.

Examples of the crystalline epoxy resin suitable as the crosslinkable curable resin (B) include, for example, Epototo YSLV-80XY, YSLV-70XY, YSLV-120TE, YSLV-120TE and YDC-1312 manufactured by Nippon Steel & Sumikin Chemical Co., Ltd., and YX-4000, YX-4000H, YX-8800, YL-6121H and YL-6640, etc. manufactured by Mitsubishi Chemical Corporation, HP-4032, HP-4032D and HP-4700, etc., manufactured by DIC Corporation, and NC-3000, etc. manufactured by Nippon Kayaku Co., Ltd.

The crosslinking agent (C) crosslinks the phenoxy resin (A) three-dimensionally by forming an ester bond with the secondary hydroxyl group of the phenoxy resin (A). Therefore, unlike strong crosslinking such as curing of a thermosetting resin, the crosslinking can be released by a hydrolysis reaction, so that the metal member 11 and the FRP layer 12 can be easily separated. Accordingly, each of the metal member 11 and the FRP layer 12 can be recycled.

As the crosslinking agent (C), an acid anhydride is preferable. The acid anhydride is not particularly limited as long as it is solid at an ordinary temperature and does not have much sublimability. However, from the viewpoint of imparting heat resistance to the metal/FRP composite 1 and reactivity, aromatic acid anhydrides having two or more acid anhydrides which react with the hydroxyl group of the phenoxy resin (A) are preferred. In particular, aromatic compounds having two acid anhydride groups, such as pyromellitic anhydride, are preferably used because the crosslink density becomes higher and the heat resistance is improved as compared with the combination of trimellitic anhydride and hydroxyl groups. Among aromatic acid dianhydrides, aromatic acid anhydrides compatible with a phenoxy resin or an epoxy resin, for example, 4,4'-oxydiphthalic acid, ethylene glycol bisanhydrotrimellitate, and 4,4'-(4,4'-isopropylidene diphenoxy) diphthalic anhydride are more preferable because they have an effect of improving Tg. In particular, an aromatic acid dianhydride having two acid anhydride groups such as pyromellitic anhydride is preferably used because it enhances crosslink density and enhances heat resistance as compared to phthalic anhydride having only one acid anhydride group. That is, an aromatic acid dianhydride has good reactivity because it has two acid anhydride groups, a cross-linked cured product having sufficient strength for demolding can be obtained in a short molding time, and the final crosslink density can be increased, because four carboxyl groups are formed by an esterification reaction with the secondary hydroxyl group in the phenoxy resin (A).

The reaction of the phenoxy resin (A), the epoxy resin as the crosslinkable curable resin (B) and the crosslinking agent (C) is based on an esterification reaction between the secondary hydroxyl group in the phenoxy resin (A) and the acid anhydride group of the crosslinking agent (C), and a reaction between carboxyl group formed by the above esterification reaction and the epoxy group of the epoxy resin, and as a result, crosslinking and curing of the resin occurs. Although a crosslinked phenoxy resin can be obtained by the reaction between the phenoxy resin (A) and the crosslinking agent (C), the melt viscosity of the adhesive resin composition can be reduced by the coexistence of the epoxy resin. As a result, excellent properties such as improved impregnation with the adherend (the metal member 11 and the FRP layer 12), acceleration of the crosslinking reaction, improvement of the crosslink density, and improvement of the mechanical strength can be achieved.

In the crosslinkable adhesive resin composition, although an epoxy resin as a crosslinkable curable resin (B) coexists, a phenoxy resin (A) which is a thermoplastic resin is a main component and it is considered that the esterification reaction between the secondary hydroxyl group of the phenoxy resin (A) and the acid anhydride group of the crosslinking agent (C) preferentially occurs. That is, the reaction between the acid anhydride used as the crosslinking agent (C) and the epoxy resin used as the crosslinkable curable resin (B) takes longer time (its reaction speed is slower). Accordingly, the reaction between the crosslinking agent (C) and the secondary hydroxyl group of the phenoxy resin (A) occurs first, and then the crosslinking agent (C) remained in the previous reaction or the residual carboxyl group derived from the crosslinking agent (C) reacts with the epoxy resin to further enhance the crosslink density. Therefore, unlike a resin composition containing an epoxy resin which is a thermosetting resin as a main component, a crosslinked cured product obtained by using a crosslinkable adhesive resin composition is a thermoplastic resin and has excellent storage stability.

In the crosslinkable adhesive resin composition utilizing the crosslinking of the phenoxy resin (A), it is preferable that the crosslinkable curable resin (B) is contained in the range of 5 parts by mass or more and 85 parts by mass or less with respect to 100 parts by mass of the phenoxy resin (A). The content of the crosslinkable curable resin (B) relative to 100 parts by mass of the phenoxy resin (A) is more preferably in the range of 9 parts by mass or more and 83 parts by mass or less, and still more preferably 10 parts by mass or more and 80 parts by mass or less. By setting the content of the crosslinkable curable resin (B) to 85 parts by mass or less, the curing time of the crosslinkable curable resin (B) can be shortened, so that the strength required for demolding can be easily obtained in a short time, and the recyclability of the FRP layer 12 is improved. This effect is further enhanced by setting the content of the crosslinkable curable resin (B) to 83 parts by mass or less, and more preferably 80 parts by mass or less. On the other hand, when the content of the crosslinkable curable resin (B) is 5 parts by mass or more, the effect of improving the crosslink density due to the addition of the crosslinkable curable resin (B) is easily obtained, and the crosslinked product of the crosslinkable adhesive resin composition easily develops Tg of 160° C. or higher, and the fluidity is improved. Incidentally, the content of the crosslinkable curable resin (B) is measured in the same manner for the peak derived from the epoxy resin by the method using IR as described above.

The mixing amount of the crosslinking agent (C) is usually in the range of 0.6 mol or more and 1.3 mol or less of the acid anhydride group per 1 mol of the secondary hydroxyl group of the phenoxy resin (A), preferably is in the range of 0.7 mol or more and 1.3 mol or less, more preferably in the range of 1.1 mol or more and 1.3 mol or less. When the amount of the acid anhydride group is 0.6 mol or more, the crosslink density will be high, resulting in excellent mechanical properties and heat resistance. This effect is further enhanced by setting the amount of the acid anhydride group to 0.7 mol or more, and further to 1.1 mol or more. When the amount of the acid anhydride group is 1.3 mol or less, it is possible to suppress unreacted acid anhydride and carboxyl group from adversely affecting the curing characteristics and the crosslink density. Therefore, it is preferable to adjust the mixing amount of the crosslinkable curable resin (B) depending on the mixing amount of the crosslinking agent (C). Specifically, for example, a carboxyl group formed by a reaction between a secondary hydroxyl group of the phenoxy resin (A) and an acid anhydride group of the crosslinking agent (C) is reacted with an epoxy resin used as the crosslinkable curable resin (B). For this purpose, the mixing amount of the epoxy resin is preferably in the range of 0.5 mol or more and 1.2 mol or less in equivalent ratio with the crosslinking agent (C). Preferably, the equivalent ratio between the crosslinking agent (C) and the epoxy resin is in the range of 0.7 mol or more and 1.0 mol or less.

When the crosslinking agent (C) is blended with the phenoxy resin (A) and the crosslinkable curable resin (B), a crosslinkable adhesive resin composition can be obtained. An accelerator (D) as a catalyst may be further added to ensure that the cross-linking reaction proceeds. The accelerator (D) is not particularly limited as long as it is a solid at ordinary temperature and has no sublimability. For example, it includes a tertiary amine such as triethylenediamine, imidazoles such as 2-methylimidazole, 2-phenylimidazole and 2-phenyl-4-methylimidazole; organic phosphines such as triphenylphosphine; and tetraphenylboron salts such as tetraphenylphosphonium tetraphenylborate. One type of these accelerators (D) may be used alone, or two or more types may be used in combination. When the accelerator (D) is used, it is preferable that the mixing amount of the accelerator (D) is in the range of 0.1 parts by mass or more and 5 parts by mass or more with respect to 100 parts by mass of the total amount of the phenoxy resin (A), the crosslinkable curable resin (B) and the crosslinking agent (C).

The crosslinkable adhesive resin composition is solid at an ordinary temperature, and its melt viscosity is as follows. The minimum melt viscosity, i.e. the lower limit of the melt viscosity in the temperature range of 160 to 250° C. is preferably not more than 3,000 Pa·s, more preferably 2,900 Pa·s or less, and still more preferably 2,800 Pa·s or less. By setting the minimum melt viscosity in the temperature range of 160 to 250° C. to 3,000 Pa·s or less, the crosslinkable adhesive resin composition can be sufficiently impregnated into the adherend at the time of heat compression by hot press or the like. Since the occurrence of defects such as voids in the adhesive resin layer 13 can be suppressed, the mechanical properties of the metal/FRP composite 1 are improved. This effect is further enhanced by setting the minimum melt viscosity in the temperature range of 160 to 250° C. to 2,900 Pa·s or less, and further 2,800 Pa·s or less.

The above adhesive resin compositions (including crosslinkable adhesive resin compositions) comprise for example, natural rubbers, synthetic rubbers, elastomers, various inorganic fillers, solvents, extender pigments, colorants, antioxidants, UV inhibitors, flame retardants, flame retardant auxiliaries and other additives, as long as they do not impair the adhesiveness or physical properties.

As described above, an oil film may be formed on the surface of the metal member 11. It may be difficult to bond the FRP and the metal member 11 with a sufficient bonding strength when an attempt is made to bond the FRP and the metal member 11 with the adhesive resin layer 13 while such an oil film is formed on the surface of the metal member 11.

That is, it may be difficult to bond the adhesive resin layer 13 and the metal member 11 with a sufficient bonding strength. As one of measures against such a problem, there is a method of degreasing the surface of the metal member 11 as described above. As another method, there is a method of adding an oil-surface bonding adhesive to the adhesive resin composition.

Here, the oil-surface bonding adhesive is an adhesive that exhibits adhesiveness to an adherend on which an oil film is formed. The oil-surface bonding adhesive is also referred to as an oil-absorbing adhesive or the like, and contains a component having a high affinity for an oil component. That is, when the oil-surface bonding adhesive is applied to the adherend, the oil-surface bonding adhesive closely adheres to the adherend while absorbing oil on the surface of the adherend. Various types of oil-surface bonding adhesives are commercially available, and in the present embodiment, they can be used without any particular limitation. That is, when the metal member 11 on which the oil film is formed and the FRP are bonded by the adhesive resin layer 13 containing a certain adhesive, the metal/FRP composite 1 showing the super-law-of-mixture may be produced. In this case, this adhesive is said to be an oil-surface bonding adhesive suitable for the present embodiment. Examples of the oil-surface bonding adhesive include Alphatech 370 (epoxy-based oil-surface bonding adhesive) manufactured by Alpha Kogyo Co., Ltd. and Devcon PW1 (methacrylate-based oil-surface bonding adhesive) manufactured by Devcon Corporation. One type of oil-surface bonding adhesive may be used alone, or a mixture of a plurality of types of oil-surface bonding adhesives may be used.

The mixing amount of the oil-surface bonding adhesive may be adjusted so that the metal/FRP composite 1 shows the super-law-of-mixture. For example, it may be more than 0 parts by mass and 50 parts by mass or less with respect to 100 parts by mass of the resin component.

In addition, an oil-surface bonding adhesive may be applied to the interface between the adhesive resin layer 13 and the metal member 11 to adhere them to each other. That is, an oil-surface bonding adhesive may be applied to at least one of the surfaces of the adhesive resin layer 13 and the metal member 11 to adhere them to each other. The specific coating amount may be adjusted so that the metal/FRP composite 1 exhibits the super-law-of-mixture. As an example, the coating amount may be 10 to 500 μm thick. The application method is not particularly limited, and examples thereof include roll coating, bar coating, spraying, dipping, and application using a brush.

As described above, as a countermeasure when an oil film is formed on the surface of the metal member 11, a method of performing degreasing, a method of adding an oil-surface bonding adhesive to the adhesive resin composition, a method of applying an oil-surface bonding adhesive to the interface between the metal member 11 and the adhesive layer 13. Any one of these may be performed or two or more thereof may be used in combination. As described above, when the metal member 11 is a hot-dip galvanized steel sheet, an electro-galvanized steel sheet, or an aluminum-plated steel sheet, an oil film is often formed on the surface of the metal member 11. Therefore, when the metal member 11 is made of such a steel plate, it is preferable to consider taking measures against the oil film.

(Thickness of Adhesive Resin Layer 13)

In the metal/FRP composite 1 according to the present embodiment, the thickness of the adhesive resin layer 13 is preferably more than 20 μm, more preferably 30 μm or more, from the viewpoint of sufficiently securing the adhesion between the metal member 11 and the FRP layer 12. By setting the thickness of the adhesive resin layer 13 to more than 20 μm, the adhesiveness between the metal member 11 and the FRP layer 12 can be sufficiently enhanced, and sufficient workability of the metal/FRP composite 1 can be obtained. On the other hand, from the viewpoint of sufficiently securing the mechanical properties of the metal/FRP composite 1, the thickness of the adhesive resin layer 13 is preferably 500 μm or less, and more preferably 200 μm or less. This is because if the thickness of the adhesive resin layer 13 is too large, the effect of enhancement of the strength of the resin by the fiber would be lowered.

(About Super-Law-of-Mixture)

Figure 11:
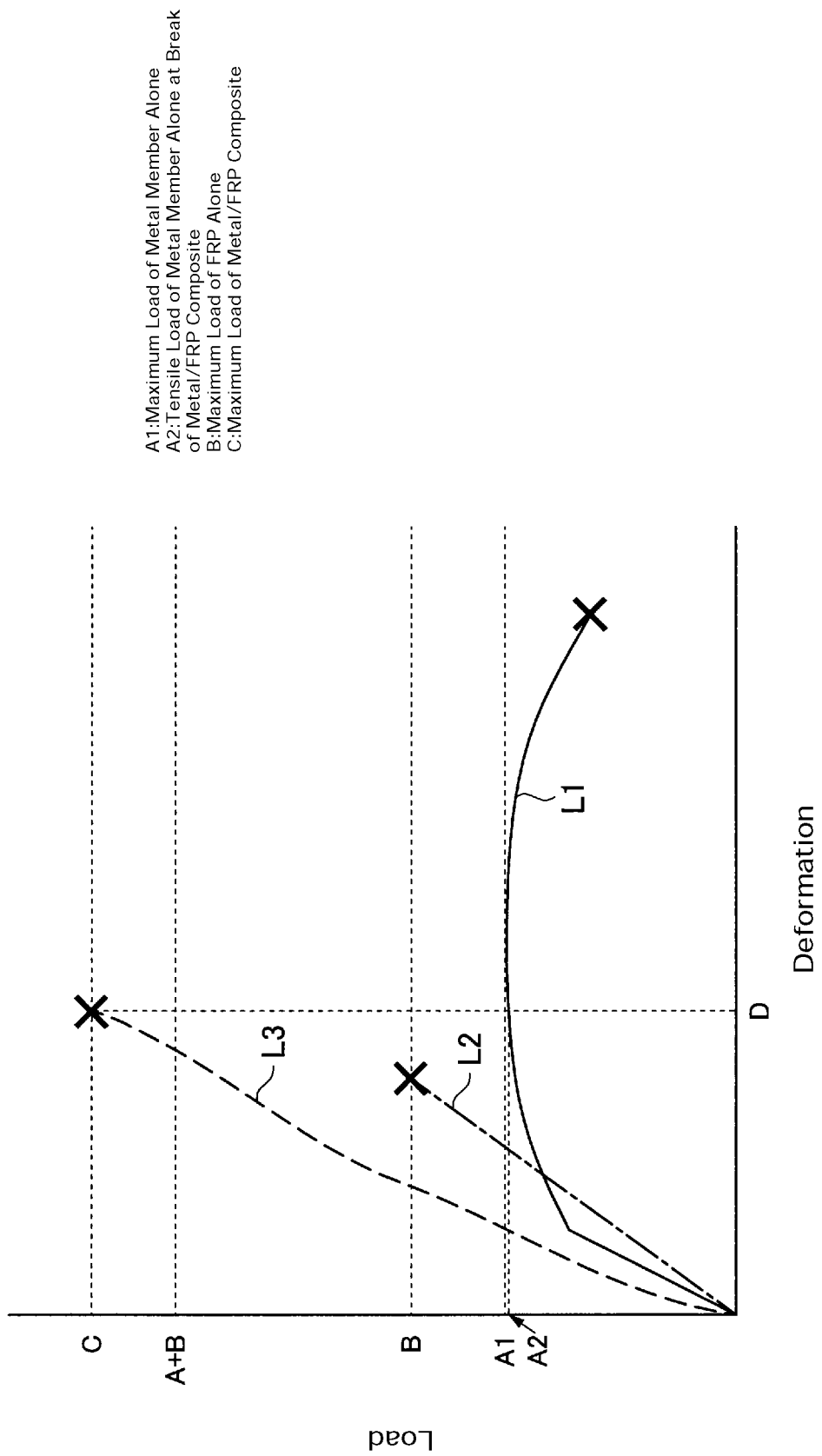
FIG. 11 is a graph schematically showing a result of a tensile test of each test specimen.

The maximum load of the metal/FRP composite 1 according to the present embodiment indicates an excellent strength exceeding law of mixture, that is, super-law-of-mixture. Here, the super-law-of-mixture in the present embodiment will be described with reference to FIG. 11. FIG. 11 is a graph schematically showing the results of measuring the tensile load of the metal member 11 alone, the tensile load of the FRP alone, and the tensile load of the metal/FRP composite 1. Here, it is assumed that the measurement of the tensile load is performed by a method described in Examples described later. The horizontal axis in FIG. 11 indicates the amount of deformation of the test specimen, and the vertical axis indicates the tensile load. The graph L1 shows the correlation between the deformation amount and the tensile load of the metal member 11 alone, wherein the load A1 shows the maximum load (the maximum value of the tensile load) of the metal member 11 alone. The load A2 indicates a tensile load of the metal member 11 at a deformation amount D described later. The mark x in the graph L1 indicates the deformation amount and the tensile load when the metal member 11 breaks.

The graph L2 shows the correlation between the amount of deformation and the tensile load of FRP alone, wherein the load B shows the maximum load (the maximum value of the tensile load) of FRP alone. The mark x in the graph L2 indicates that the FRP was broken. The graph L3 shows the correlation between the amount of deformation and the tensile load of the metal/FRP composite 1, wherein the load C shows the maximum load (the maximum value of the tensile load) of the metal/FRP composite 1. The mark x in the graph L3 indicates that the metal/FRP composite 1 breaks, and the deformation D indicates the deformation (elongation) of the metal/FRP composite 1 when the metal/FRP composite 1 breaks.

The super-law-of-mixture in the present embodiment means that Formula (2-2) among Formulae (2-1) and (2-2) described below which are considered as the super-law-of-mixture is satisfied.

$$C > A1 + B \quad (2\text{-}1)$$

$$C > A2 + B \quad (2\text{-}2)$$

That is, the determination of yes or no of the super-law-of-mixture may be made based on whether or not Formula (2-2) is satisfied. Here, since the load A1 is larger than the load A2, if Formula (2-1) is satisfied, Formula (2-2) is necessarily satisfied. Therefore, when Formula (2-1) is satisfied, it is possible to determine that the super-law-of-mixture is satisfied.

In the case of a metal of A1>>A2, such as a high tensile steel, Formula (2-2) is satisfied, but Formula (2-1) is often not satisfied. It is possible to judge whether or not the super-law-of-mixture is satisfied based on only Formula (2.2). However, for example, in the case of a metal in which the load A1 and the load A2 are close to each other, such as when soft steel is used (for example, when A1/A2<1.1, (FIG. 11 is an example thereof)), the load A1 may be easier to measure. In this case, it is easier to determine the super-law-of-mixture based on Formula (2-1). At this time, it is determined that the super-law-of-mixture is satisfied if Formula (2-2) is satisfied, even if Formula (2-1) is not satisfied.

If the load C is substantially equal to the total load of the load A1 and the load B, then A1>A2 and thus the super-law-of-mixture is satisfied. As shown in a comparative examples described later, in a metal/FRP composite that does not satisfy the requirements of the present embodiment, the load C may be lower than the total load of the loads A2 and B.

Here, the ratio of the load C to the total load of the load A2 and the load B (=C/(A2+B)) is defined as a degree of the super-law-of-mixture. In this embodiment, a degree of the super-law-of-mixture exceeds 1.00. A degree of the super-law-of-mixture is preferably 1.01 or more, more preferably 1.05 or more. Here, in the determination of the satisfaction of the super-law-of-mixture described above, in the case of a metal such as soft steel in which the load A1 and the load A2 are close to each other, it can be easily determined by using Formula (2-1). However, it is preferable that a degree of the super-law-of-mixture is calculated by C/(A2+B).

(About Formula (1))

In order for the metal/FRP composite 1 to exhibit the super-law-of-mixture, it is needed that the metal member 11, the FRP layer 12 and the adhesive resin layer 13 have the above-described configuration, for example, and that satisfy the following Formula (1).

$$(T1 \times E1)/(T2 \times E2) > 0.3 \quad \text{Formula (1)}$$

In Formula (1), T1 is the total thickness of the metal member 11, E1 is the elastic modulus of the metal member 11, T2 is the total thickness of the FRP layer 12 and the adhesive resin layer 13, and E2 is the elastic modulus of the FRP layer 12 and the adhesive resin layer 13. Therefore, T1 and E1 are parameters related to the metal member 11, and T2 and E2 are parameters related to the FRP layer 12 and the adhesive resin layer 13. T1 is defined as "the total thickness of the metal member 11" because the metal/FRP composite 1 may be manufactured using a plurality of metal members 11, such as in the case wherein the FRP layer 12 is sandwiched between a plurality of metal members 11. Further, the elastic modulus E2 may be calculated according to the law of mixture. For example, if the FRP layer 12 is A and the adhesive resin layer 13 is B, the elastic modulus E2 is calculated by (elastic modulus of A×thickness of A/total thickness T2 of FRP layer 12 and adhesive resin layer 13)+(elastic modulus of B×thickness of B/total thickness T2 of FRP layer 12 and adhesive resin layer 13). Here, it is not necessary to consider the elastic modulus of the adhesive resin layer 13 in the elastic modulus E2. This is because the tensile strengths of the FRP layer 12 and the adhesive resin layer 13 substantially depend on the FRP layer 12, and more specifically, depend on the reinforcing fiber material 102 in the FRP layer 12. Further, the adhesive resin layer 13 may be very thin compared to the thickness of the FRP layer 12 in some cases. In these cases, T2 may be regarded as only the thickness of the FRP layer 12. That is, the thickness of the adhesive resin layer 13 may be ignored. For example, when the thickness of the adhesive resin layer 13 is 5 μm or less with respect to the thickness of the FRP layer 12, the thickness of the adhesive resin layer 13 may be ignored. When a plurality of types of metal members 11 are stacked, E is calculated according to the law of mixture. For example, when the metal member 11 is composed of A, B, . . . , then E1 is calculated by (elastic modulus of A×thickness of A/total thickness T1 of the plurality of metal members)+(elastic modulus of B×thickness of B/total thickness T1 of the plurality of metal members) . . . . Similarly, when a plurality of types of FRP layers 12 are stacked, E2 is calculated according to the law of mixture. For example, assuming that the plurality of FRP layers 12 are A, B, C . . . , E2 is calculated by (elastic modulus of A×thickness of A/total thickness T2 of the plurality of FRP layers)+(elastic modulus of B×thickness of B/total thickness T2 of the plurality of FRP layers) . . . . Note that the elastic modulus of the FRP layer 12 may be the elastic modulus of the reinforcing fiber material 102 constituting the FRP layer 12.

The maximum load of the metal/FRP composite 1 that satisfies Formula (1) indicates an excellent strength exceeding the law of mixture, i.e., the super-law-of-mixture. The reason is presumed as follows. The metal/FRP composite 1 has a metal member 11, an FRP layer 12, and an adhesive resin layer 13 interposed therebetween. The FRP layer 12 has brittleness, but the metal member 11 has ductility and a large elastic modulus E1. Here, since the adhesive resin layer 13 contains the phenoxy resin (A) having excellent adhesiveness to the metal member 11, the metal member 11 and the FRP layer 12 are firmly bonded by the adhesive resin layer 13. Therefore, when a large tensile load is applied to the metal/FRP composite 1, the fracture of the FRP layer 12 (having brittleness) can be suppressed by the action of the metal member 11 (having ductility and a large elastic modulus E1). Therefore, it is considered that the metal/FRP composite 1 delays brittle fracture and has higher strength when compared with the metal member 11 alone or the FRP layer 12 alone under the same total thickness conditions.

The metal member 11 and the adhesive resin forming the adhesive resin layer 13 have different coefficients of thermal expansion, and the metal member 11 has a larger amount of change due to heat. Therefore, when the metal/FRP composite 1 is molded at a high temperature and then cooled in the manufacturing process, the FRP layer 12 and the adhesive resin layer 13 follow the metal member 11 having a large expansion and contraction. Therefore, they are fixed under the compressive force (internal stress) to a certain extent from the beginning. When a tensile load is applied to the metal/FRP composite 1, the FRP layer 12 and the adhesive resin layer 13 in the compressed state have a larger elongation margin than in the non-compressed state, and their fracture will be delayed by that much. As a result, it is considered that the entire metal/FRP composite 1 can exhibit high tensile strength. Such an effect can be obtained more effectively when the elastic modulus E1 of the metal member 11 is larger. That is, when the elastic modulus E1 of the metal member 11 increases, the tensile load per unit elongation of the metal/FRP composite 1 increases. As described above, the elongation margin is increased by the internal stress. Therefore, as the elastic modulus E1 of the metal member 11 is larger, the tensile load corresponding to this margin (the tensile load required to extend the metal/FRP composite 1 by the above-mentioned margin) increases. Therefore, the metal/FRP composite 1 can withstand higher tensile loads.

Here, Formula (1) as described above is derived by the following experiment.

That is, for many samples in which the thickness and the elastic modulus of the metal member and the thickness and the elastic modulus of the FRP were changed, whether or not the strength exceeding the law of mixture was obtained was verified by experiments, and the verification results (whether or not the strength exceeding the law of mixture was obtained) by each of samples were plotted on a coordinate plane having a horizontal axis representing the thickness of FRP and vertical axis representing the thickness of the metal member. Then, a straight line representing the boundary of the region where the strength exceeding the law of mixture is obtained is derived from the results indicated as an approximate curve by a known statistical analysis process. According to Formula (1) as described above, for example, when the elastic modulus E2 of the FRP layer 12 is fixed and if the elastic modulus E1 of the metal member 11 is high, an excellent strength exceeding the law of mixture can be realized, even if the total thickness T1 of the metal member 11 is reduced. Conversely, if the elastic modulus E1 of the metal member 11 is low, the total thickness T1 of the metal member 11 will be increased in order to realize an excellent strength exceeding the law of mixture.

For the above reasons, as the metal/FRP composite 1 satisfying the above Formula (1), one in which a material of the metal member 11 is iron (steel material, iron-based alloy, etc.) is preferable. Since iron has a large elastic modulus E1 of about 200 GPa and has toughness, an excellent strength can be maintained even when the thickness T1 is low. In addition, as a material of the metal member 11, although not as good as iron, titanium (about 105 GPa) and aluminum (about 70 GPa) having a large elastic modulus E1 are preferably used.

The thicknesses of the metal member 11, the FRP layer 12 and the adhesive resin layer 13 can be measured in accordance with the cross-sectional method of the optical method described in JIS K 5600-1-7, 5.4 as follows. That is, using an ordinary temperature curable resin that can be embedded without gaps and without adversely affecting the sample, using a low-viscosity epomount 27-777 manufactured by Refinetech Co., Ltd. as a main component and 27-772 as a curing agent, the sample was embedded. The sample is cut in the direction parallel to its thickness direction to expose its cross-section at a place to be observed by a cutting machine, and an observation surface of the sample is prepared by polishing the exposed surface with polishing paper of a count specified by JIS R #6252 or 6253 (for example, 280 count, 400 count or 600 count). When an abrasive material is used to create the observation surface, it is polished with an appropriate grade of diamond paste or similar paste. In addition, buffing may be performed as necessary to smooth the surface of the sample to a state that can be suited for observation.

Figure 4:
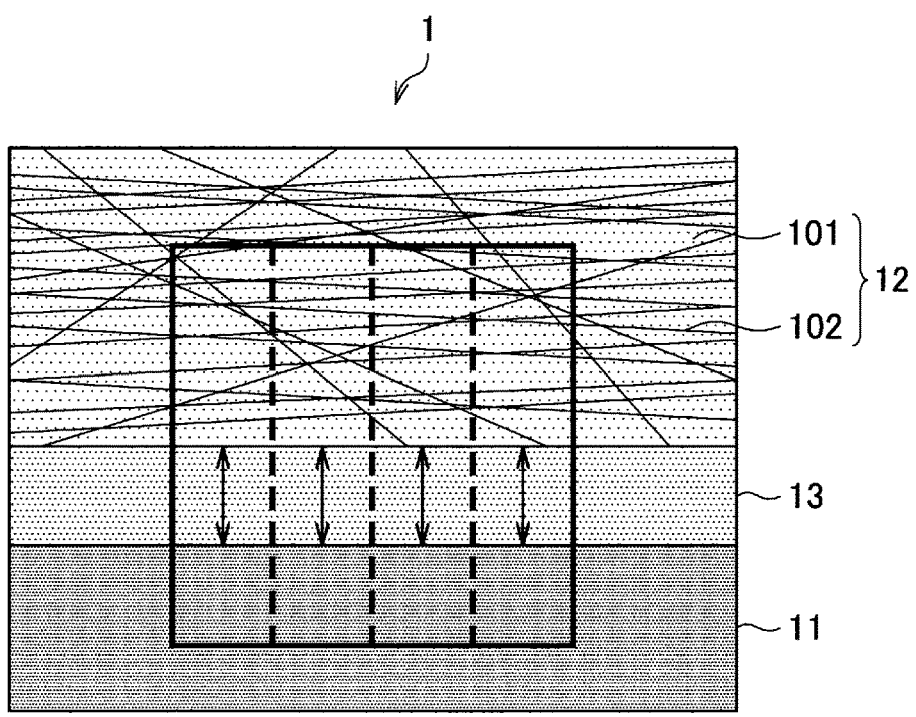
FIG. 4 is an explanatory diagram for describing a method of measuring a thickness.

A microscope equipped with an appropriate illumination system to give an optimal image contrast, and capable of measuring with an accuracy of 1 μm (for example, BX51 manufactured by Olympus Corporation) is used and the size of its visual field is selected to set 300 μm. Here, the size of the visual field may be changed so that the respective thickness can be confirmed (for example, if the thickness of the FRP layer 12 is 1 mm, the size of the visual field may be changed to confirm the thickness). For example, when measuring the thickness of the adhesive resin layer 13, the observation visual field is divided into four equal parts as shown in FIG. 4, and the thickness of the adhesive resin layer 13 is measured at the center in the width direction of each dividing point. The average thickness is the thickness in the visual field. This observation visual field is measured by selecting five different locations, dividing the observation visual field into four equal parts, measuring the thickness of each part, and calculating the average value of the measurements. For adjacent observation visual fields, they should be selected at a distance of 3 cm or more. The value obtained by further averaging the average values at these five points may be used as the thickness of the adhesive resin layer 13. Further, the measurement of the thickness of the metal member 11 or the FRP layer 12 may be performed in the same manner as the measurement of the thickness of the adhesive resin layer 13.

When the boundary surfaces of the metal member 11, the FRP layer 12, and the adhesive resin layer 13 are relatively clear, the thickness of the adhesive resin layer 13 can be measured by the above method. However, the boundary between the FRP layer 12 and the adhesive resin layer 13 is not always clear. When the interface is not clear, the interface may be specified by the following method. That is, the metal/FRP composite 1 is scraped off from the metal member 11 using a grinder or the like to which a diamond grindstone is attached. Then, the cut surface is observed with the above-mentioned microscope, and the area ratio of the fiber portion constituting the reinforcing fiber material 102 (the area ratio of the fiber portion to the total area of the observation visual field) is measured. The area ratio may be measured in a plurality of observation visual fields, and the arithmetic average value thereof may be used as the area ratio of the fiber portion. Then, the cut surface when the area ratio of the fiber portion exceeds 10% may be used as a boundary surface between the FRP layer 12 and the adhesive resin layer 13.

(About Preferable Range of $(T1 \times E1)/(T2 \times E2)$)

Figure 12:
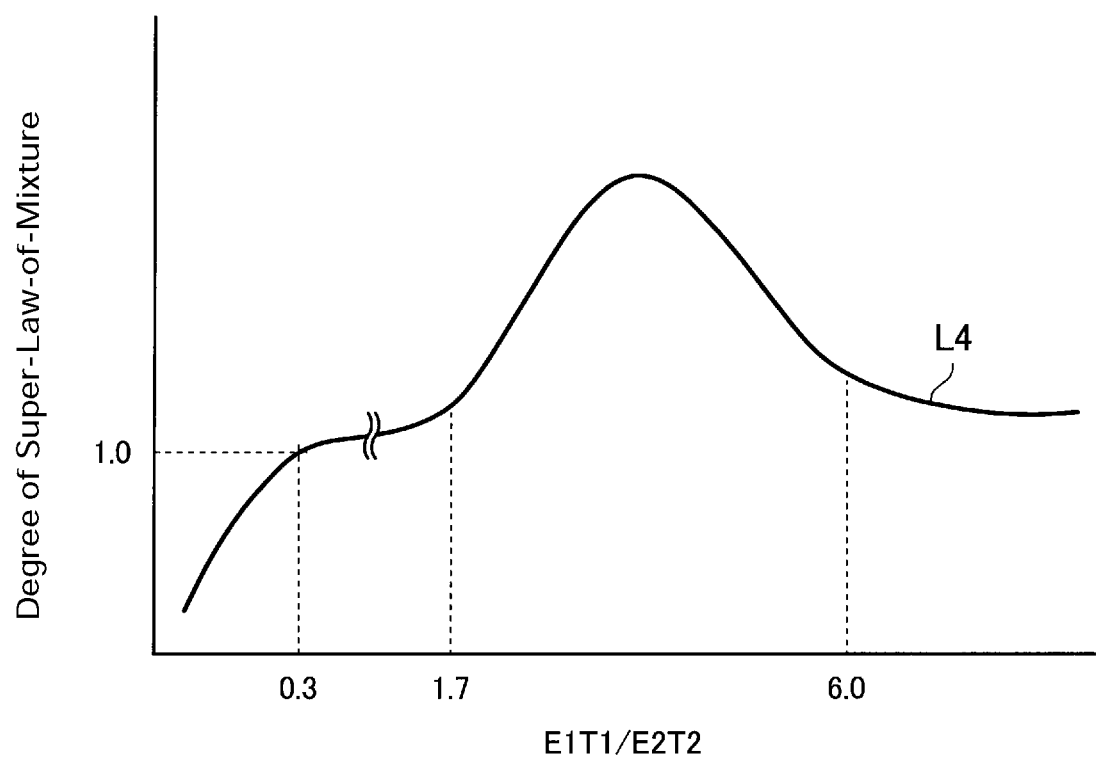
FIG. 12 is a graph schematically showing a preferable range of $(T1 \times E1)/(T2 \times E2)$.

As described above, a degree of the super-law-of-mixture is preferably 1.01 or more, and more preferably 1.05 or more. In other words, it can be said that the larger a degree of the super-law-of-mixture, the better. Here, the present inventors examined in detail the results of the below-described examples (examples in which the metal/FRP composite 1 was manufactured under various manufacturing conditions and their characteristics were evaluated), and it became clear that there is a correlation between $(T1 \times E1)/(T2 \times E2)$ and a degree of the super-law-of-mixture. Since the manufacturing conditions of each of Examples are various, it is not possible to simply compare degrees of the super-law-of-mixture in each of Examples. Therefore, the present inventors estimated the degree of the super-law-of-mixture when the manufacturing conditions were leveled, and plotted the result on the coordinate plane indicating $(T1 \times E1)/(T2 \times E2)$ on the horizontal axis and a degree of the super-law-of-mixture on the vertical axis to obtain graph L4 shown in FIG. 12. According to the graph L4, when $(T1 \times E1)/(T2 \times E2)$ is 0.3, a degree of super-law-of-mixture becomes 1.00, and when $(T1 \times E1)/(T2 \times E2)$ is larger than 0.3 (that is, when Formula (1) is satisfied), a degree of the super-law-of-mixture exceeds 1.00. Further, when $(T1 \times E1)/(T2 \times E2)$ is in the range of 1.7 to 6.0, a degree of the super-law-of-mixture has a local maximum value. Therefore, it is understood that the preferable lower limit of $(T1 \times E1)/(T2 \times E2)$ is 1.7 or more, and the preferable upper limit is 6.0 or less. When $(T1 \times E1)/(T2 \times E2)$ is a value within this range, a degree of the super-law-of-mixture is a value of 1.01 or more, and further, a value of 1.05 or more. A more preferred lower limit is 2.5 or more, and a more preferred upper limit is 3.0 or less. This is because when $(T1 \times E1)/(T2 \times E2)$ is 2.5 or more and 3.0 or less, a degree of the super-law-of-mixture becomes a local maximum value or a value closer to the local maximum value. The local maximum value may be larger than 1.05, for example, about 1.3.

[Method for Producing Metal/Fiber-Reinforced Resin Material Composite]

Figure 5:
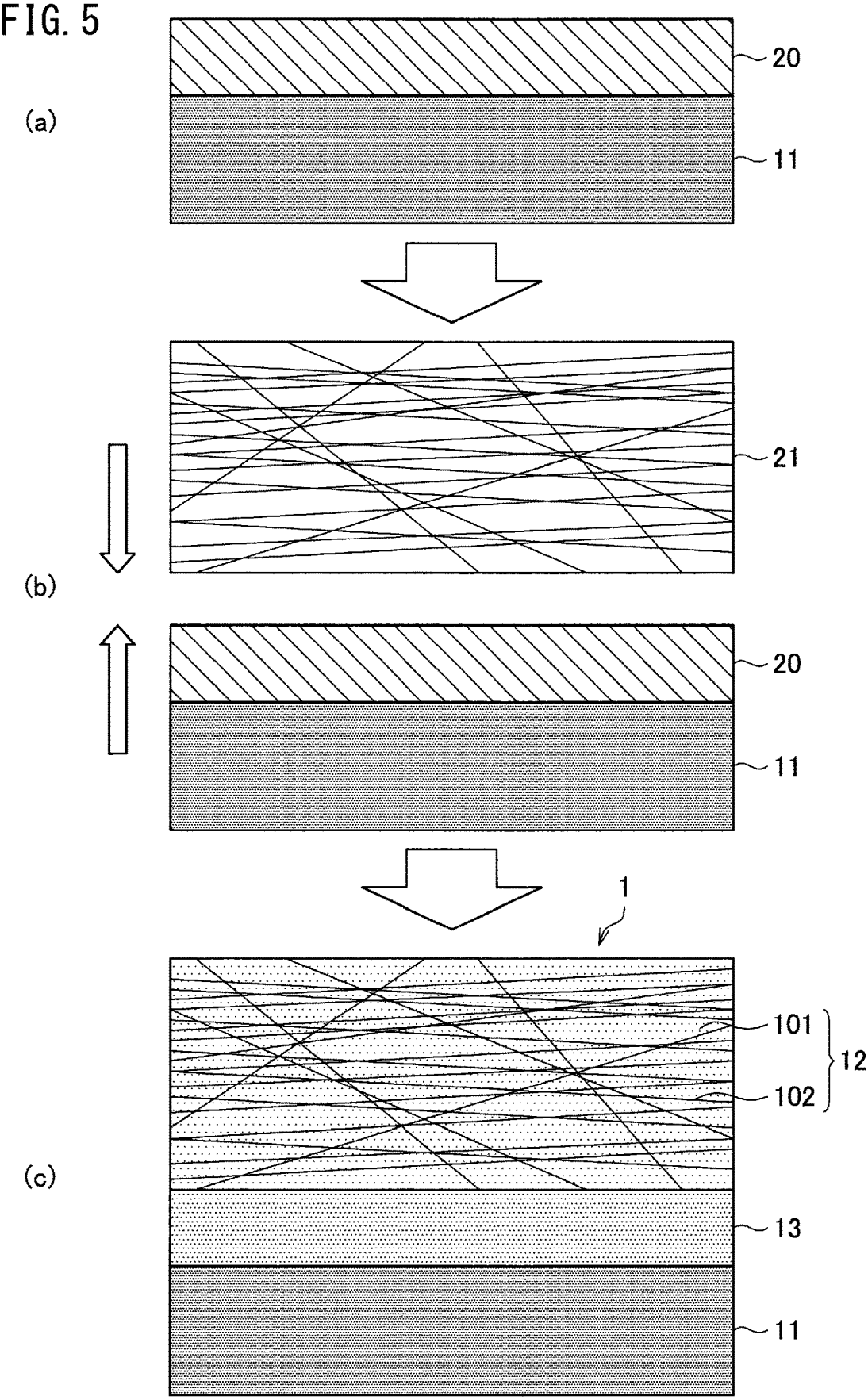
FIG. 5 is an explanatory diagram showing one example of a production process of the metal/fiber-reinforced resin material composite according to the same embodiment.
Figure 6:
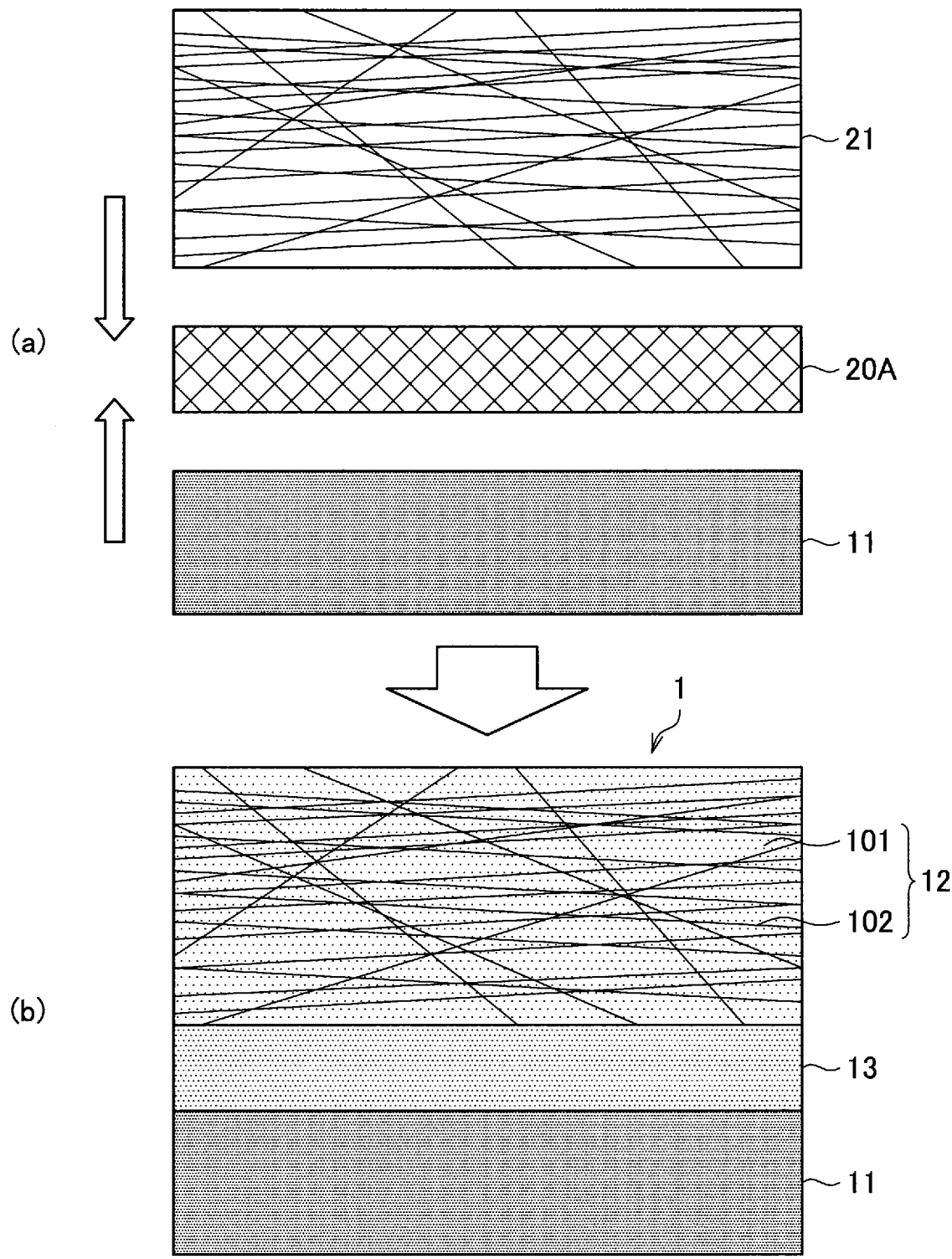
FIG. 6 is an explanatory diagram showing an example of a production process of another aspect of the metal/fiber-reinforced resin material composite according to the same embodiment.

As described above, the configuration of the metal/FRP composite 1 as the metal/fiber-reinforced resin material composite according to the present embodiment has been described in detail. Next, referring to FIG. 5 and FIG. 6, a method for producing the metal/FRP composite 1 of the present embodiment will be described. FIGS. 5 and 6 are explanatory diagrams showing an example of the manufacturing steps of the metal/FRP composite 1.

The metal/FRP composite 1 is made by bonding an FRP processed into a desired shape (or a precursor thereof, i.e. FRP molding prepreg) and a metal member 11 with an adhesive resin composition (including a crosslinkable adhesive resin composition) and solidifying the adhesive resin composition (curing in the case of a crosslinkable adhesive resin composition). The bonded FRP becomes the FRP layer 12, and the solidified or cured product of the adhesive resin composition becomes the adhesive resin layer 13. As a composite formation method by adhering the metal member 11 and the FRP with an adhesive resin composition and bonding them together, for example, the following Method 1 or Method 2 can be used, but Method 1 is more preferable.
(Method 1)

In Method 1, after forming a coating film of the adhesive resin composition (which will later become the adhesive resin layer 13) on the surface of the metal member 11, the FRP or the FRP molding prepreg (first prepreg) which will later become the FRP layer 12 is laminated and heat-press bonded.

In this Method 1, for example, as shown in FIG. 5(*a*), a powder or liquid adhesive resin composition is applied to at least one surface of the metal member 11 to form a coating film 20. In Method 1, the coating film 20 may be formed not on the side of metal member 11 but on the side of FRP to be the FRP layer 12 or side of the FRP molding prepreg (first prepreg). The case where the coating film 20 is formed on the side of the metal member 11 will be described as an example.

Next, as shown in FIG. 5 (*b*), an FRP molding prepreg 21 which will later become the FRP layer 12 is disposed on the side of the metal member 11 on which the coating film 20 is formed. In this way, a laminate stacked to each other in the order of the metal member 11, the coating film 20 and the FRP molding prepreg 21 are formed. In FIG. 5(*b*), instead of the FRP molding prepreg 21, an FRP can be laminated, but in this case, the bonding surface of the FRP is preferably activated by being roughened by blasting or the like, plasma treatment, corona treatment, or the like. Next, by heating and pressing this laminate, a metal/FRP composite 1 is obtained as shown in FIG. 5 (*c*).

In Method 1, as a method of forming the coating film 20 which will later become the adhesive resin layer 13, a method of powder-coating a powder of the adhesive resin composition on the surface of the metal member 11 is preferable. The adhesive resin layer 13 formed by powder coating is easily melted because the adhesive resin composition is fine particles, and has a suitable space in the coating film 20 so that voids are easily removed. In addition, when the FRP or the FRP molding prepreg 21 is heated and pressed, the adhesive resin composition wets the surface of the metal member 11 well, so that a degassing step such as in varnish coating is not required, and defects due to insufficient wettability such as voids seen in a film are unlikely to occur.

In Method 1, a coating film 20 is formed on both surfaces of the metal member 11 in FIG. 5(*a*). An FRP molding prepreg 21 (or FRP) may be applied to both the coating films 20, respectively in FIG. 5(*b*). Further, the FRP molding prepreg 21 (or FRP) which will become the FRP layer 12 is not limited to one layer, and may be a plurality of layers (see FIG. 2). Further, the FRP molding prepreg 21 (or FRP) which will become the FRP layer 12 may be laminated using two or more metal members 11 so as to be sandwiched therebetween.
(Method 2)

In Method 2, the adhesive resin composition formed into a film and the FRP or FRP molding prepreg (first prepreg) which will later become the FRP layer 12 are laminated onto the metal member 11 and they are heated and pressed.

In this Method 2, for example, as shown in FIG. 6(*a*), an adhesive sheet 20A made of an adhesive resin composition in the form of a film, and an FRP molding prepreg 21 which will later become an FRP layer 12 are provided on at least one surface of the metal member 11 to form a laminate in which the metal member 11, the adhesive sheet 20A, and the FRP molding prepreg 21 are laminated in this order. In FIG. 6(*a*), instead of the FRP molding prepreg 21, FRP can be laminated, but at this case, the bonding surface of the FRP is preferably activated by being roughened by blasting or the like, plasma treatment, corona treatment, or the like. Next, by heating and pressing this laminate, a metal/FRP composite 1 is obtained as shown in FIG. 6 (*b*).

In Method 2, in FIG. 6(*a*), the adhesive sheet 20A and the FRP molding prepreg 21 (or FRP) may be laminated on both surfaces of the metal member 11, respectively. Further, the FRP molding prepreg 21 (or FRP) which will later become FRP layer 12 is not limited to one layer, and may be a plurality of layers (see FIG. 2). In addition, the adhesive sheet 20A and the FRP prepreg 21 which will become FRP layer 12 (or FRP) are laminated using two or more metal members 11 so as to sandwich them therebetween.
(Composite Formation with Metal Members)

Composite formation of the metal member 11 and the FRP is preferably performed, for example, as follows.

i) In the above Method 1, the adhesive resin composition is applied as a powder or a varnish to a predetermined position on the bonding surface of the metal member 11 to form the coating film 20, which will later be the adhesive resin layer 13. Next, a laminate in which the FRP molding prepregs 21 which will later be the FRP layers 12 is laminated thereon is placed in a pressure molding machine, and pressure molded to form the adhesive resin layer 13.

(ii) In the above Method 2, the adhesive sheet 20A which will later be adhesive resin layer 13 is disposed at a predetermined position on the bonding surface of the metal member 11. Next, a laminate in which the FRP molding prepregs 21 which will later be the FRP layers 12 are laminated thereon is placed in a pressure molding machine, and pressure molded to form the adhesive resin layer 13.
(Thermocompression Bonding Conditions)

In the above Methods 1 and 2, the thermocompression bonding conditions for forming a composite of the metal member 11, the adhesive sheet 20A, and the FRP molding prepreg 21 (or FRP) which will later be FRP layer 12 are as follows.

The thermocompression bonding temperature is not particularly limited, but is, for example, in the range of 100° C. or more and 400° C. or less, preferably 150° C. or more and 300° C. or less, more preferably in the range of 160° C. or more and 270° C. or less, and further preferably in the range of 180° C. or more and 250° C. or less. Within such a temperature range, a temperature no lower than the melting point for a crystalline resin is more preferable, and a temperature of Tg+150° C. or higher is more preferable for a non-crystalline resin. If the temperature exceeds the upper limit temperature, the resin may decompose due to the application of excessive heat, and if the temperature is lower than the lower limit temperature, the melt viscosity of the resin is high, and thus the adhesiveness to the reinforcing fiber material and the impregnation property to the reinforcing fiber base material becomes worse.

The pressure at the time of thermocompression bonding is, for example, preferably 3 MPa or more, and more preferably in the range of 3 MPa or more and 5 MPa or less. If the pressure exceeds the upper limit, an excessive pressure is applied, which may cause deformation or damage. If the pressure is lower than the lower limit, the impregnating property to the reinforcing fiber base material is deteriorated.

About the thermocompression bonding time, the thermocompression bonding can be sufficiently performed if it is done for at least 3 minutes or more, and it is preferable that it is done for 5 minutes or more and 20 minutes or less.

In the thermocompression bonding step, the composite batch molding of the metal member 11, the adhesive sheet 20A, and the FRP molding prepreg 21 (or FRP) which will later be FRP layer 12 may be performed by a pressure molding machine. The composite batch molding is preferably performed by a hot press, but the material preheated to a predetermined temperature may be promptly disposed in a low-temperature press molding machine for processing. By performing the above-mentioned thermocompression bonding process, the FRP layer 12 can be bonded to the metal member 11 in a state where a compressive force (internal stress) is applied to the FRP layer 12 and the adhesive resin layer 13, and thus the super-law-of-mixture can be exhibited.

(Additional Heating Step)

In Methods 1 and 2, as the adhesive resin composition for forming the adhesive resin layer 13 and the raw material resin for forming the matrix resin 101, a crosslinkable adhesive resin composition comprising a crosslinkable curable resin (B) and a crosslinking agent (C) in addition to the phenoxy resin (A) is used, and an additional heating step may be further included.

When a crosslinkable adhesive resin composition is used, the adhesive resin layer 13 can be formed by a cured product (solidified product) in a first cured state where it has been solidified but has not been crosslinked (cured) in the thermocompression bonding step. When the same as or the same type of resin to the crosslinkable adhesive resin composition is used as the raw material resin of the matrix resin of the FRP prepreg 21 which will later be the FRP layer 12, the FRP layer 12 including the matrix resin 101 composed of a cured product (solidified product) in the first cured state can be formed.

As described above, through the above-mentioned thermocompression bonding step, it is possible that the metal member 11, the adhesive resin layer 13 of the cured product (solidified product) in the first cured state, and the FRP layer 12 are laminated and integrated to form an intermediate (preform) of the metal/FRP composite 1. In this intermediate, if necessary, a material in which the matrix resin 101 is a cured product (solidified product) in the first cured state can be used as the FRP layer 12. Then, after the thermocompression bonding process, an additional heating process is performed on the intermediate to post-cure the adhesive resin layer 13 of at least the cured product (solidified product) in the first cured state in order to make the resin crosslinked and cured to change into a cured product in a second cured state (crosslinked cured product). Preferably, the FRP layer 12 can also be post-cured to cross-link and cure the matrix resin 101 made of the cured product (solidified product) in the first cured state to change it to the cured product (crosslinked cured product) in the second cured state.

The additional heating step for post-curing is preferably performed, for example, at a temperature in the range of 200° C. or more and 250° C. or less for about 30 minutes to 60 minutes. Note that, instead of the post-curing, a thermal hysteresis in a post process such as painting may be used.

As described above, when the crosslinkable adhesive resin composition is used, Tg after crosslinking and curing is greatly improved as compared with the phenoxy resin (A) alone. Therefore, before and after the additional heating step is performed on the above-mentioned intermediate, that is, in the process that the resin changes from a cured product (solidified product) in the first cured state to a cured product (crosslinked cured product) in the second cured state, Tg changes. Specifically, the Tg of the resin before crosslinking in the intermediate is, for example, 150° C. or less, whereas the Tg of the crosslinked resin after the additional heating step is, for example, 160° C. or more, preferably 170° C. or more and 220° C. or lower, and thus the heat resistance can be significantly increased.

(Pretreatment Step)

When the metal/FRP composite 1 is manufactured, as a pretreatment step of bonding the metal member 11 and the FRP with the adhesive resin composition the metal member 11 is preferably degreased. It is more preferable to perform release treatment to mold or remove the attached matter on the surface of the metal member 11 (dust removal). Except for a steel plate having a very high adhesion such as TFS (Tin Free Steel), it is difficult for the metal member 11 such as a steel plate to which rust-preventive oil or the like is adhered to obtain a strength exceeding the above-described law of mixture unless its adhesion is restored by degreasing. Therefore, by performing the above pretreatment on the metal member 11, the metal/FRP composite 1 may easily obtain a strength exceeding the law of mixture. Regarding the necessity of degreasing, it is sufficient to check and judge whether or not a laminate actually exhibits the super-law-of-mixture, wherein the laminate comprises the target metal member preliminarily bonded and integrated with the target FRP with the target adhesive resin composition without degreasing step. Regarding the judgement whether or not the super-law-of-mixture is exhibited will be described later in the [Confirmation of Presence or Absence of Super-law-of-mixture]. As described above, in addition to or instead of the degreasing treatment, the oil-surface bonding adhesive may be added to the adhesive resin composition or the oil-surface bonding adhesive may be applied to the interface between the adhesive resin layer 13 and the metal member 11.

(Post-Step)

In the post-step for the metal/FRP composite 1, in addition to painting, drilling for mechanical bonding with other members such as bolting and riveting, and application of an adhesive for adhesive bonding, and the like are performed.

Second Embodiment

[Configuration of Metal/Fiber-Reinforced Resin Material Composite]

Figure 7:
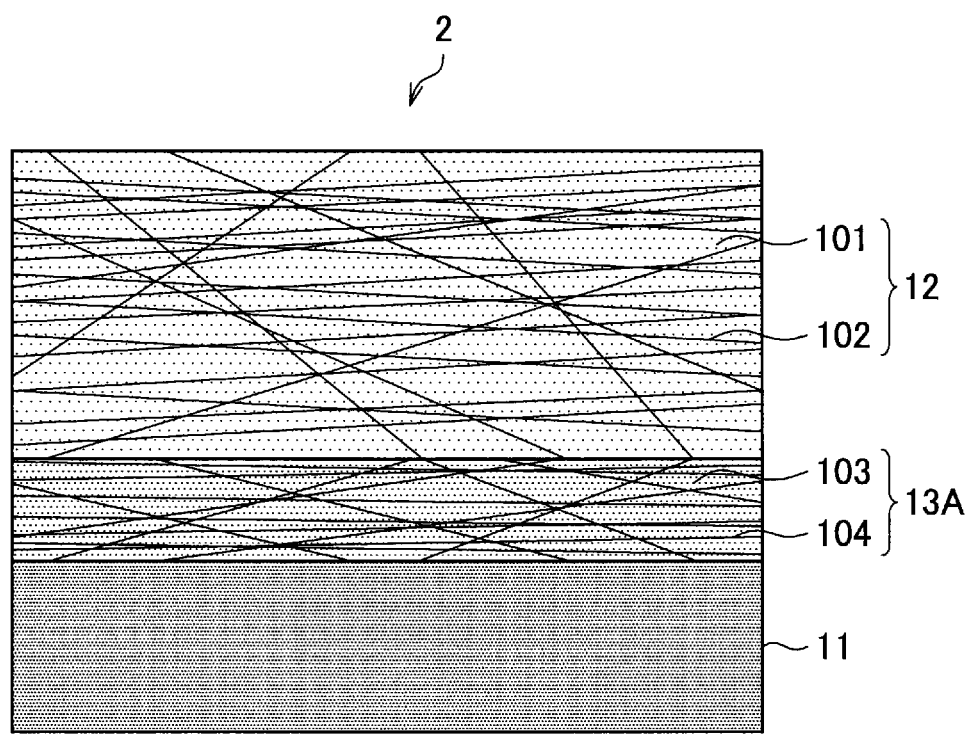
FIG. 7 is a schematic view showing a cross-sectional structure of a metal/fiber-reinforced resin material composite according to a second embodiment of the present invention.
Figure 8:
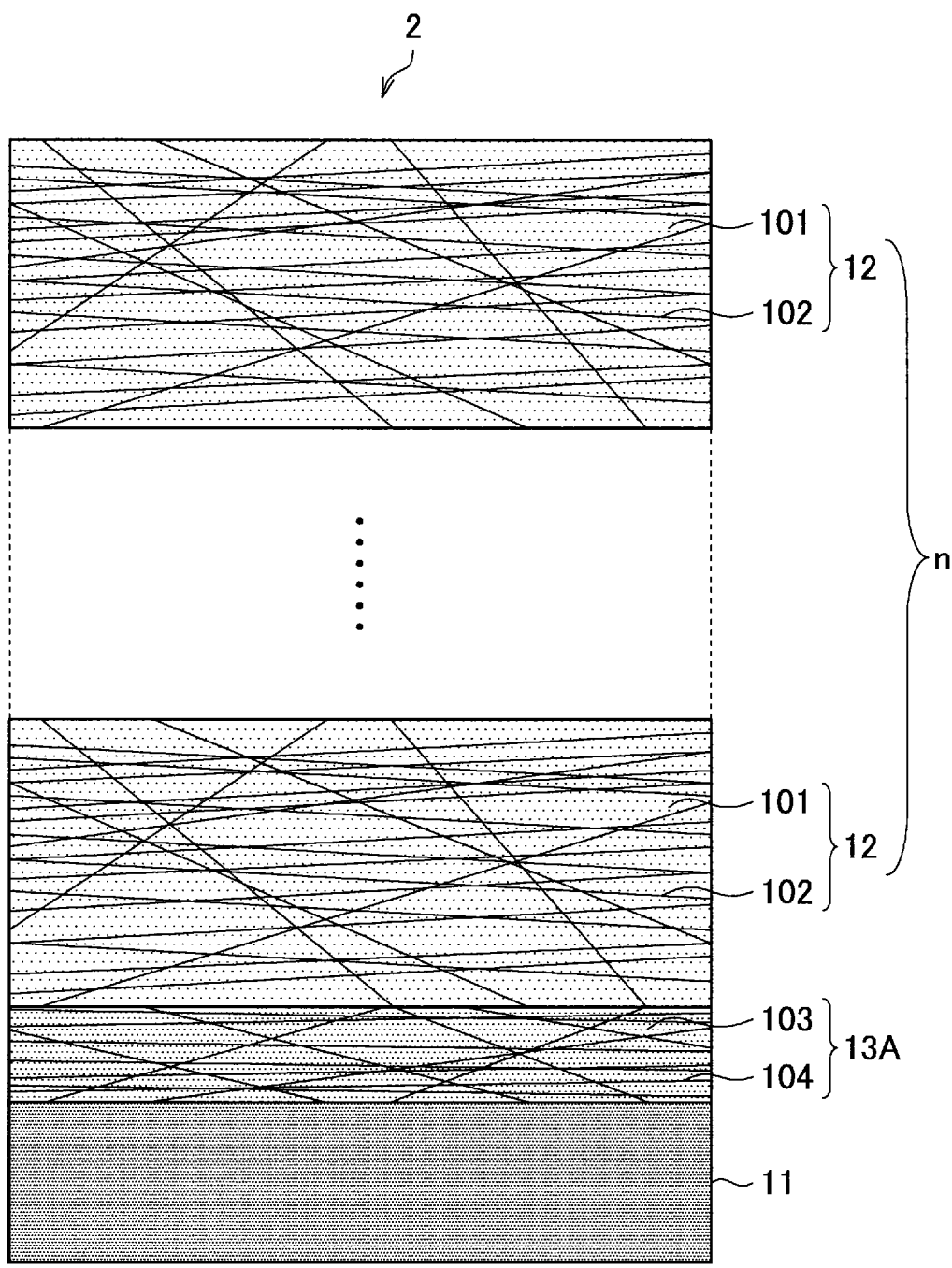
FIG. 8 is a schematic view showing a cross-sectional structure of another aspect of the metal/fiber-reinforced resin material composite according to the same embodiment.

Next, the configuration of the metal/fiber-reinforced resin material composite according to the second embodiment of the present invention will be described with reference to FIGS. 7 and 8. FIGS. 7 and 8 are schematic views showing a cross-sectional structure in the stacking direction of the metal/FRP composite 2 as an example of the metal/fiber-reinforced resin material composite according to the present embodiment.

As shown in FIG. 7, the metal/FRP composite 2 includes a metal member 11, an FRP layer 12 as an example of a first fiber-reinforced resin material according to the present embodiment, and an adhesive resin layer 13A. The metal member 11 and the FRP layer 12 are formed into a composite via the adhesive resin layer 13A. The present embodiment is different from the above-described first embodiment in that the adhesive resin layer 13A is a second fiber-reinforced resin material having the matrix resin 103 and the reinforced fiber material 104 contained in the matrix resin 103 to form a composite. The matrix resin 103, as described later, is a solidified or cured product of an adhesive resin composition containing 50 parts by mass or more of the phenoxy resin (A) based on 100 parts by mass of the resin component.

Here, the configuration of the FRP layer 12 is the same as that of the above-described first embodiment. In the present embodiment, the adhesive resin layer 13A is provided so as to be in contact with at least one surface of the metal member 11, and firmly bonds the metal member 11 and the FRP layer 12. However, the adhesive resin layer 13A and the FRP layer 12 may be provided not only on one side of the metal member 11 but also on both sides. Further, a laminate including the adhesive resin layer 13A and the FRP layer 12 may be disposed between the two metal members 11.

Also, in the metal/FRP composite 2, similarly to the metal/FRP composite 1, the FRP layer 12 is made of at least one or more FRP molding prepregs. The number of layers is not limited to one but may be two or more as shown in FIG. 8. When the FRP layer 12 has a plurality of layers, the number n of the FRP layers 12 may be appropriately set depending to the purpose of use. When there are a plurality of FRP layers 12, each layer may have the same configuration or may be different. That is, the resin type of the matrix resin 101 constituting the FRP layer 12 and the type and content ratio of the reinforcing fiber material 102 may be different for each of layers.

In addition, the maximum load of the metal/FRP composite 2 shows an excellent strength exceeding the law of mixture, that is, super-law-of-mixture, similarly to the metal/FRP composite 1 according to the first embodiment. Further, the total thickness T1 of the metal member 11 and the elastic modulus E of the metal member 11, and the total thickness T2 of the FRP layer 12 and the adhesive resin layer 13 and the elastic modulus E2 of the FRP layer 12 satisfy the relationship of the above-mentioned formula (1). The preferred range of (T×E1)/(T2×E2) is the same as in the first embodiment. In the second embodiment, since the elastic modulus of the adhesive resin layer 13A is large, it is preferable that E2 be the elastic modulus of the laminate of the FRP layer 12 and the adhesive resin layer 13.

Hereinafter, each component and other components of the metal/FRP composite 2 will be described in detail, but a description common to the metal/FRP composite 1 according to the first embodiment will be appropriately omitted, and the description of the adhesive resin layer 13A focuses on portions different from the resin layer 13.

(Adhesive Resin Layer 13A)

The adhesive resin layer 13A bonds the metal member 11 and the FRP layer 12 of the metal/FRP composite 2.

Adhesive Resin Composition

The matrix resin 103 which is the adhesive resin constituting the adhesive resin layer 13A is a solidified or cured product of the adhesive resin composition containing 50 parts by mass or more of the phenoxy resin (A) with respect to 100 parts by mass of the resin component. By using such an adhesive resin composition, the metal member 11 and the FRP layer 12 can be firmly bonded.

Here, from the viewpoint of sufficiently securing the adhesiveness between the FRP layer 12 and the adhesive resin layer 13A, the matrix resin 101 of the FRP layer 12 preferably is formed of the same as or same type to the resin forming the matrix resin 103 which is the adhesive resin constituting the adhesive resin layer 13A.

In the case where the metal/FRP composite 2 has a plurality of FRP layers 12, the type of resin constituting the matrix resin 103 of the adhesive resin layer 13A and the type of resin of the matrix resin 101 of the FRP layer 12 closest to the adhesive resin layer 13A in contact with the adhesive resin layer 13A may be the same or different. From the viewpoint of ensuring the adhesiveness between the adhesive resin layer 13A and the FRP layer 12 in contact therewith, as the resin type of the matrix resin 103 and the matrix resin 101, a combination of the same or the same type of resin or the similar ratio of polar groups contained in the polymer is preferably selected.

Crosslinkable Adhesive Resin Composition

As in the case of the adhesive resin layer 13 according to the first embodiment, as the matrix resin 103 of the adhesive resin layer 13A, for example, a crosslinkable resin composition (i.e., a cured product of the adhesive resin composition) can be used by blending a crosslinking agent such as an acid anhydride, an isocyanate, a caprolactam, or the like to the adhesive resin composition containing the phenoxy resin (A). Since the heat resistance of the adhesive resin composition is improved by performing a crosslinking reaction using the secondary hydroxyl group contained in the phenoxy resin (A), the crosslinkable adhesive resin composition is suitable for a member used in a higher temperature environment. For application for crosslinking formation using the secondary hydroxyl group in the phenoxy resin (A), it is preferable to use a crosslinkable adhesive resin composition in which a crosslinkable curable resin (B) and a crosslinking agent (C) are blended.

In the same manner as in the first embodiment, when a crosslinkable adhesive resin composition utilizing crosslinkage of the phenoxy resin (A) is used as the matrix resin 103, it is preferable that the crosslinkable curable resin (B) is contained in a range of 5 parts by mass or more and 85 parts by mass or less with respect to 100 parts by mass of the phenoxy resin (A). The content of crosslinkable curable resin (B) relative to 100 parts by mass of the phenoxy resin (A) is more preferably in the range of 9 parts by mass or more and 83 parts by mass or less, and still more preferably 10 parts by mass or more and 80 parts by mass or less.

Furthermore, when the crosslinking agent (C) is blended with the phenoxy resin (A) and the crosslinkable curable resin (B), a crosslinking adhesive resin composition can be obtained.

An accelerator (D) may be further added as a catalyst to ensure a crosslinking reaction. The accelerator (D) is the same as that described in the first embodiment. When the matrix resin 103 is formed by making the crosslinkable adhesive resin composition into a fine powder and attaching it to the reinforcing fiber base material using a powder coating method under an electrostatic field, as the accelerator (D), an imidazole-based latent catalyst which is solid at an ordinary temperature and is has a catalyst activation temperature of 130° C. or higher is preferably used.

In addition, the matrix resin 103 is the same as the adhesive resin constituting the adhesive resin layer 13 according to the first embodiment described above. The points that are not described above for the adhesive resin layer 13A are the same as those of the adhesive resin layer 13 according to the first embodiment. For example, the above-mentioned oil-surface bonding adhesive may be added to the adhesive resin composition. Further, an oil-surface bonding adhesive may be applied to the interface between the metal member 11 and the adhesive resin layer 13A.

[Method for Producing Metal/Fiber-Reinforced Resin Material Composite]

Figure 9:
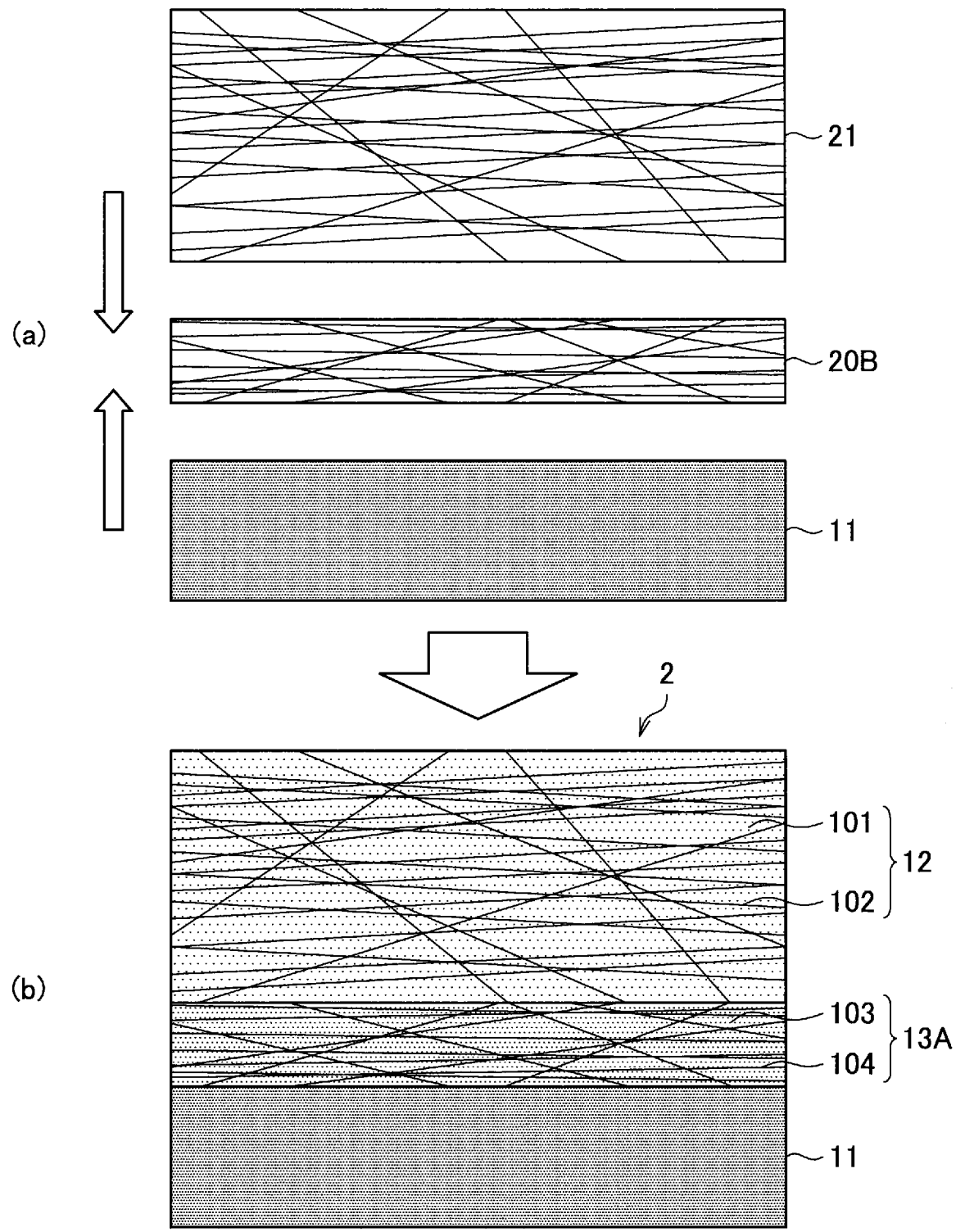
FIG. 9 is an explanatory diagram showing an example of a production process of the metal/fiber-reinforced resin material composite according to the same embodiment.

The configuration of the metal/FRP composite 2 as the metal/fiber-reinforced resin material composite according to the present embodiment has been described above. Next, the method for production of the metal/FRP composite 2 according to the present embodiment will be described with reference to FIG. 9. FIG. 9 is an explanatory diagram illustrating an example of a manufacturing process of the metal/FRP composite 2.

The metal/FRP composite 2 is formed by bonding an FRP (or an FRP molding prepreg that is a precursor thereof) processed into a desired shape and a metal member 11 using an adhesive sheet containing an adhesive resin composition (including crosslinkable adhesive resin composition) which will later be a matrix resin 103 and a reinforcing fiber material 104, and solidifying the adhesive resin composition (cured in the case of a crosslinkable adhesive resin composition). The bonded FRP becomes the FRP layer 12, and the adhesive sheet containing the solidified or cured product of the adhesive resin composition becomes the adhesive resin layer 13A. As a method of forming a composite of the metal member 11 and the FRP by adhering and bonded with the above-mentioned adhesive sheet, the following Method 3 can be used.

(Method 3)

In Method 3, an adhesive sheet (a second prepreg) containing an adhesive resin composition which will later be the matrix resin 103 and the reinforcing fiber material 104 and an FRP or an FRP molding prepreg (a first prepreg) which will later be the FRP layer 12 are laminated to the metal member 11 and heat-pressed.

In this Method 3, for example, as shown in FIG. 9(a), at least one surface of the metal member 11 is provided with an adhesive sheet 20B containing an adhesive resin composition which will later be the matrix resin 103 and the reinforcing fiber material 104, and the FRP molding prepreg 21 which will later be the FRP layer 12 is arranged in an overlapping manner to form a laminate in which the metal member 11, the adhesive sheet 20B and the FRP molding prepreg 21 are stacked in this order. Here, the adhesive sheet 20B is a sheet-shaped prepreg for bonding the metal member 11 and the FRP layer 12. In FIG. 9(a), instead of the FRP molding prepreg 21, an FRP can be laminated, but in this case, it is preferable that activation of the bonding surface of FRP by, for example, the roughing such as blasting treatment, plasma treatment, corona treatment has been performed. Next, by heating and pressing this laminate, a metal/FRP composite 2 is obtained as shown in FIG. 9 (b).

In Method 3, the FRP molding prepreg 21 (or FRP) is bonded to the metal member 11 by the adhesive sheet 20B containing the reinforcing fiber material 104. In this case, the resin component (the portion which will later be the matrix resin 103) derived from the adhesive resin composition impregnated in the reinforcing fiber material 104 functions as an adhesive resin.

In Method 3, in FIG. 9(a), the adhesive sheet 20B and the FRP molding prepreg 21 (or FRP) may be laminated on both surfaces of the metal member 11, respectively. The FRP molding prepreg 21 (or FRP) which will later be the FRP layer 12 is not limited to one layer, and may be a plurality of layers (see FIG. 8). In addition, the adhesive sheet 20B and the FRP molding prepreg 21 (or FRP) which will later be the FRP layer 12 may be laminated using two or more metal members 11 so as to be sandwiched therebetween.

(Composite Formation with Metal Members)

Formation of a composite of the metal member 11 and the FRP is preferably performed, for example, as follows.

At a predetermined position on the bonding surface of the metal member 11, the adhesive sheet 20B which will later be the adhesive resin layer 13A is arranged. Next, a laminate in which the FRP molding prepreg 21 which will later be the FRP layer 12 is laminated thereon is set in a pressure molding machine, and molded by pressure to form the adhesive resin layer 13A.

<Thermocompression Conditions>

In the above Method 3, the thermocompression bonding conditions for forming a composite of the metal member 11, the adhesive sheet 20B, and the FRP molding prepreg 21 (or FRP) which will later be FRP layer 12 are as follows. The thermocompression bonding temperature, the pressure at the time of thermocompression bonding, and the thermocompression bonding time are the same as those in the Method 2 described above.

In the thermocompression bonding step, a composite batch molding of the metal member 11, the adhesive sheet 20B, and the FRP molding prepreg 21 (or FRP) which will later be FRP layer 12 may be performed by a pressure molding machine.

(Additional Heating Step)

In Method 3, when a crosslinkable adhesive resin composition containing the crosslinkable curable resin (B) and the crosslinking agent (C) in addition to the phenoxy resin (A) is used as the adhesive resin composition for forming the adhesive resin layer 13A and the raw material resin for forming the matrix resin 101, an additional heating step can be further included as in Methods 1 and 2. The details of the additional heating step are the same as those in the first embodiment as described above ("adhesive resin layer 13" is replaced by "adhesive resin layer 13A", and "metal/FRP composite 1" is replaced by "metal/FRP composite 2", respectively).

(Pre-Treatment Step and Post-Treatment Step)

The pre-treatment step and the post-treatment step are also the same as in the first embodiment described above.

(Production Method of Adhesive Sheet)

Here, a method of production of the adhesive sheet 20B (second prepreg) used for forming the adhesive resin layer 13A will be described. When the FRP layer 12 is formed of the same type of resin as the matrix resin 103 of the adhesive resin layer 13A, it can be produced by the following method.

In the adhesive sheet 20B for forming the adhesive resin layer 13A, as the reinforcing fiber base material which will later be the reinforcing fiber material 104, for example, a nonwoven fabric base material using chopped fibers or a cloth material using continuous fibers, a unidirectional reinforcing fiber base material (UD material) or the like can be used as in the FRP layer 12, but from the viewpoint of the reinforcing effect, use of a cloth material or a UD material is preferable.

For the adhesive sheet 20B, it is preferable to use a prepreg prepared by a powder coating method, rather than a prepreg prepared by a conventionally known method such as a wet melt or a film stack method. The prepreg made by the powder coating method has a good drapability because the resin in the form of fine particles is impregnated into the reinforcing fiber base material, and can follow an adherend even when the adherend has a complicated shape. Therefore, it is suitable for batch molding hot press.

As a main method of the powder coating method, for example, there are an electrostatic coating method, a fluidized bed method, a suspension method, and the like. Depending on the type of the reinforcing fiber base material or the type of the matrix resin, any method may be appropriately selected. Among them, the electrostatic coating method and the fluidized bed method are methods suitable for thermoplastic resins, and are preferable because the process is simple and the productivity is good. In particular, the electrostatic coating method is the most preferable method because it is excellent in uniformity of adhesion of the adhesive resin composition to the reinforcing fiber base material.

When a powder coating of the adhesive resin composition which will later be the matrix resin 103 is performed for forming the adhesive sheet 20B, it is preferred to obtain a prepreg by making the adhesive resin composition containing the phenoxy resin (A) described above as a fine powder, and adhering the fine powder to a reinforcing fiber base material by powder coating.

For pulverization of the adhesive resin composition containing the phenoxy resin (A), for example, a pulverizer/mixer such as a low-temperature dry pulverizer (Centry Dry Mill) can be used, but is not limited thereto. When the adhesive resin composition for the matrix resin 103 is pulverized, the components of the adhesive resin composition may be pulverized and then mixed, or the components may be mixed in advance and then pulverized. In this case, it is preferable to set the pulverization conditions such that each fine powder has an average particle diameter described later. The fine powder thus obtained has an average particle diameter in the range of 10 μm or more and 100 μm or less, preferably in the range of 40 μm or more and 80 μm or less, and more preferably in the range of 40 μm or more and 50 μm or less. When the average particle diameter is 100 μm or less, the energy when the adhesive resin composition collides with the fibers in powder coating under an electrostatic field can be reduced, and the ratio of adhesion to the reinforcing fiber base material can be increased. In addition, by setting the average particle diameter to 10 μm or more, it is possible to prevent particles due to an entrained air flow from scattering and to suppress a decrease in adhesion efficiency, and to prevent resin fine powder floating in the air from deteriorating the working environment.

When performing powder coating of a crosslinkable adhesive resin composition in which a crosslinkable curable resin (B) and a crosslinking agent (C) are blended with a phenoxy resin (A) as an adhesive resin composition for forming the adhesive sheet 20B, the average particle diameters of the fine powder of the phenoxy resin (A) and the fine powder of the crosslinkable curable resin (B) are preferably in the range of 1 to 1.5 times the average particle diameter of the fine powder of the crosslinking agent (C). By setting the particle diameter of the fine powder of the crosslinking agent (C) to be equal to or less than the particle diameters of the fine powder of the phenoxy resin (A) and the crosslinkable curable resin (B), the crosslinking agent (C) can reach the inside of the reinforcing fiber base material and adhere to the reinforcing fiber material. In addition, since the crosslinking agent (C) is present evenly around the particles of the phenoxy resin (A) and the particles of the crosslinkable curable resin (B), the crosslinking reaction can reliably proceed.

In the powder coating for forming the adhesive sheet 20B, it is preferable to perform the powder coating such that the adhesion amount (resin content: RC) of the adhesive resin composition which will later be the matrix resin 103 to the reinforcing fiber base material is, for example, in the range of 20% or more and 50% or less. RC is more preferably in the range of 25% or more and 45% or less, and even more preferably in the range of 25% or more and 40% or less. By setting the RC to 50% or less, it is possible to prevent the mechanical properties such as the tensile and flexural modulus of the FRP from lowering. In addition, by setting the RC to 20% or more, the necessary amount of the resin adhered can be secured, so that the matrix resin 103 is sufficiently impregnated into the inside of the reinforcing fiber base material, and the thermophysical properties and mechanical properties can be improved.

The fine powder of the powder-coated adhesive resin composition (which will later be the matrix resin 103) is fixed to the reinforcing fiber base material by heating and melting. In this case, the powder may be applied to the reinforcing fiber base material and then heat-fused, or may be fused at the same time of coating the pre-heated reinforcing fiber base material with the fine powder of the adhesive resin composition. In this way, by heating and melting the fine powder of the adhesive resin composition on the surface of the reinforcing fiber base material, the adhesion to the reinforcing fiber base material can be increased, and the fine powder of the coated adhesive resin composition can be prevented from being falling off. However, at this stage, the adhesive resin composition which will later be the matrix resin 103 is concentrated on the surface of the reinforcing fiber base material, and does not reach the inside of the reinforcing fiber base material as in the molded article after the heat and pressure molding. Incidentally, the heating time for fusing the adhesive resin composition after powder coating is not particularly limited, but is usually 1 to 2 minutes. The melting temperature is in the range of 150 to 240° C., preferably in the range of 160 to 220° C., more preferably in the range of 180 to 200° C. If the melting temperature exceeds the upper limit, the curing reaction may proceed, and if the melting temperature is lower than the lower limit, the heat fusion becomes insufficient, and during handling work, fall off or, drop out or etc. of the fine powder of the adhesive resin composition may occur. Here, an oil-surface bonding adhesive may be added to the adhesive resin composition. Although the specific method of addition is not particularly limited, for example, the following method may be mentioned. When the oil-surface bonding adhesive is a liquid, the adhesive resin composition is finely cut, pulverized, and mixed with the oil-surface bonding adhesive. Using the mixture as a raw material, the same process as in the above-described production method may be performed. As a method of cutting and pulverizing, the above-mentioned pulverization method may be used. When the oil-surface bonding adhesive is solid, the oil-surface bonding adhesive is dissolved in an organic solvent, the resulting solution is mixed with the adhesive resin composition, and the organic solvent is volatilized and dried. Using this as a raw material, the same steps as in the above-described production method may be performed. Further, the same steps as in the above-described production method may be performed using a mixture as a raw material obtained by physically cutting, pulverizing, and mixing the oil-surface bonding adhesive and the adhesive resin composition with a stirrer or the like.

Also, as for the FRP molding prepreg 21 used for forming the FRP layer 12, it is preferable to use a prepreg manufactured by the above powder coating method for one adjacent to at least the adhesive resin layers 13 and 13A. Since the adhesive resin layers 13 and 13A and the FRP molding prepreg 21 used are all manufactured by the powder coating method, the interface between the two is mixed in a rough state at the time of heating and pressing and becomes integral, the adhesive strength between the adhesive resin layers 13, 13A and the FRP layer 12 can be improved by the anchor effect.

<Effects of First and Second Embodiments>

According to the first and second embodiments described above, the metal/FRP composites 1 and 2 in which the metal member 11 and the FRP layer 12 are firmly bonded via the adhesive resin layer 13, 13A are provided. These metal/FRP composites 1 and 2 are lightweight, excellent in workability, and can be manufactured by a simple method. For example, even if the metal member 11 is a steel material subjected to a rustproofing treatment, the metal member 11 and the FRP layer 12 have a high adhesive strength without performing a special surface roughening treatment or the like. In addition, when forming a composite of the metal member 11 and the FRP which will later be the FRP layer 12, it can be done in a batch process simultaneously with the molding of the metal member 11 by hot pressing, so that the manufacturing cost can be reduced. Therefore, the metal/FRP composites 1 and 2 of the above-described embodiments are lightweight and high-strength materials, and can be suitably used not only as housings for electric/electronic devices, but also as structural members in applications such as automobile members and aircraft members. Furthermore, according to the metal/FRP composites 1 and 2, all six problems when using the above-described FRP for an automobile member can be solved, so that the metal/FRP composite can be particularly suitably used as an automobile member.

EXAMPLES

The present invention will be described more specifically with reference to the following examples, but the present invention is not limited to these examples. Incidentally, the test and the measuring method of various physical properties in these Examples are as follows.

[Average Particle Diameter (D50)]

The average particle diameter was measured by a laser diffraction/scattering type particle size distribution measuring device (Microtrack MT3300EX, manufactured by Nikkiso Co., Ltd.) when the cumulative volume became 50% on a volume basis.

[Melt Viscosity]

Using a rheometer (manufactured by Anton Paar), a sample size of 4.3 cm$^3$ was sandwiched between parallel plates, and the temperature was raised at 20° C./min, the melt viscosity was measured at a frequency of 1 Hz and at a load strain of 5% at 180° C.

[Resin Content (RC:%)]

It was calculated from the weight (W1) of the reinforcing fiber base material before the application of the matrix resin and the weight (W2) of the FRP molding material after the application of the resin using the following formula.

Resin content $(RC:\%) = (W2-W1)/W2 \times 100$

W1: Weight of reinforcing fiber base before application of resin
W2: Weight of FRP molding material after application of resin

[Measurement of Thickness of Adhesive Resin Layer]

The thickness of the adhesive resin layer was measured by the method mentioned earlier.

[Measurement of Tensile Load and Tensile Modulus (Elastic Modulus)]

JIS K 7164: 2005 The mechanical properties (tensile strength and tensile modulus) of the metal/FRP composite obtained according to the test conditions for isotropic and orthotopic fiber reinforced plastics were measured. The tensile load is obtained by multiplying the tensile strength by the cross-sectional area of the test specimen (tensile strength (N/mm$^2$)=tensile load (N)/cross-sectional area of test specimen (mm$^2$)). The dimensions of the test specimens were 200 mm×25 mm.

Figure 10:
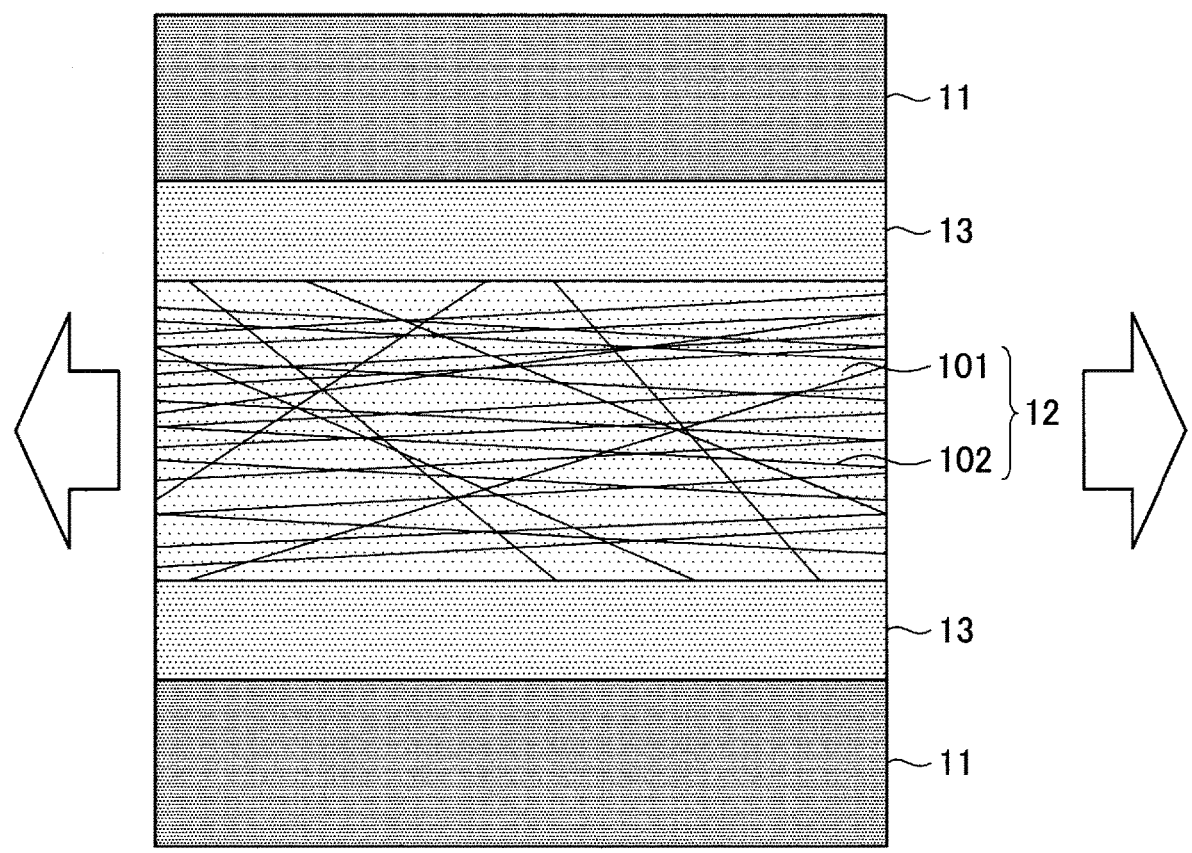
FIG. 10 is an explanatory diagram showing a configuration of a sample of a metal/FRP composite for tensile test in Examples and Comparative Examples.

Here, as schematically shown in FIG. 10, the metal members 11 are arranged on both sides of the FRP laminate in which the FRP layer 12 and the adhesive resin layer 13 (or the adhesive resin layer 13A) are laminated. A sample of a metal/FRP composite for a tensile test was obtained by thermocompression bonding under the conditions shown in each of Examples and Comparative Examples. The direction of the arrow in FIG. 10 indicates the direction in which the load is applied.

[Confirmation of Presence or Absence of Super-Law-of-Mixture]

Confirmation of whether or not the super-law-of-mixture was expressed was performed as follows. The metal member 11 and the FRP layer 12 (here, the prepreg before the FRP layer 12 is integrated with the metal member 11) are individually subjected to a tensile test by the above-described measurement method, and the maximum load (load A1, B) is measured. Next, the tensile test is performed also on the metal/FRP composite in which the metal member 11 and the FRP layer 12 are formed into a composite by the above-described measurement method, and the maximum load (load C) is measured. Further, based on the deformation amount D when the load C is measured (the deformation amount of the metal/FRP composite at break) and based on the result of the tensile test of the metal member 11, the tensile load (load A2) of the metal member 11 at the deformation amount D is determined. Then, whether or not Formulae (2-1) and (2-2) are satisfied decided. If at least Formula (2-2) is satisfied, it is determined that the super-law-of-mixture is realized. In this Example, Formula (2-1) is defined as "criterion 1", and Formula (2-2) is defined as "criterion 2". A degree of the super-law-of-mixture is calculated by C/(A2+B), but when criterion 1 is also satisfied, a degree of the law of the over-mixture corresponding to criterion 1 is calculated as C/(A1+B). The degree of the super-law-of-mixture is preferably 1.01 or more, and more preferably 1.05 or more. For example, when Formula (2-1) is satisfied, the maximum load of the composite is more than the total loads of each component alone, by preferably 1% or more, more preferably 5% or more. That is, a degree of the super-law-of-mixture is preferably 1.01 or more, and more preferably 1.05 or more. In this case, in the test specimen, it is preferable that the size of the metal member and the FRP alone is the same as the size of the metal member and the FRP layer in the composite test specimen. In the above-mentioned determination of necessity of degreasing (pretreatment step), the present method can also confirm the presence or absence of the super-law-of-mixture in advance.

If individual materials of the metal member 11 and the FRP layer 12 is not available and only the metal/FRP composite is available, the metal member 11 is peeled off from the FRP layer 12 to obtain individual members, respectively. If it is difficult to peel off, using a grinder or the like to which a diamond whetstone has adhered, a material in which only the metal member 11 of the metal/FRP composite has been scraped off, and a material in which only the FRP layer 12 has been scraped off, are prepared. By performing the tensile test on the respective specimens, the tensile load of the individual component alone is measured.

Specifically, cut out three test specimens from the metal/FRP composite. The size of each test specimen may be determined according to the size of the obtained metal/FRP composite or the like, but may be, for example, a strip having a width of 25 mm and a length of 200 mm. In order to prevent the test specimen from being damaged by a test specimen holding mechanism such as a chuck of a tensile tester, a glass epoxy tab generally specified in a standard such as JIS K7164: 2005 is attached to the test specimen. These are referred to as first to third test specimens. Then, by observing the cross section of any of the test specimens in accordance with the cross-sectional method of the optical method of JIS K 5600-1-7, 5.4, the thicknesses of the metal member 11, the FRP layer 12, and the adhesive resin layer 13 were measured. Subsequently, the maximum load of the metal/FRP composite is measured by performing the above-described tensile test on the first test piece. That is, the first test specimen is used as the metal/FRP composite metal member 11.

On the other hand, the FRP layer 12 and the adhesive resin layer 13 are removed from the second test specimen. The removal method is as described above. That is, the second test specimen is used as the metal member 11. When the FRP layer 12 and the adhesive resin layer 13 are scraped off, the metal member 11 of about 5 to 10% of the measured thickness of the metal member 11 may be scraped off. The error in the measured thickness is taken into account. On the other hand, there is no problem even if the adhesive resin layer 13 slightly remains on the metal member 11. This is because the maximum load of the adhesive resin layer 13 is negligibly smaller than the maximum load of the metal member 11. Next, the maximum load (load A1) of the metal member 11 is measured by performing the above-described tensile test on the second test specimen. Further, a tensile load (load A2) of the metal member 11 at the deformation amount D is obtained based on the deformation amount D when the load C is measured and the result of the tensile test of the metal member 11.

On the other hand, the metal member 11 and the adhesive resin layer 13 are removed from the third test specimen. The removal method is as described above. That is, the third test specimen is used as the FRP layer 12. When the metal member 11 and the adhesive resin layer 13 are scraped off, the FRP layer 12 of about 5 to 10% of the measured thickness of the FRP layer 12 may be scraped off. The error in the measured thickness is taken into account. On the other hand, there is no problem even if the adhesive resin layer 13 slightly remains in the FRP layer 12. This is because the maximum load of the adhesive resin layer 13 is negligibly smaller than the maximum load of the FRP layer 12. Next, the maximum load of the FRP layer 12 is measured by performing the above-described tensile test on the third test specimen. Then, it may be determined whether or not the super-law-of-mixture is satisfied based on each measured value and Formulae (2-1) and (2-2) (preferably, Formula (2-2)). The method for measuring the tensile load of the respective materials, i.e., the metal member and the FRP in the composite material in the case where the metal member has been subjected to the surface treatment can be carried out in the same manner as described above. The method for measuring the tensile load of the respective materials, i.e., the metal member and the FRP in the composite material in the case where the metal member has been subjected to the surface treatment can be carried out in the same manner as described above. Further, in the tensile test, when the sample was broken, the case where the metal plate was peeled from the sample, that is, the metal/FRP composite was evaluated as peeling: x (peeled), and the case where not peeled was evaluated as peeling: o (not peeled).

[FRP Prepreg]
Polyamide CFRP Prepreg
  BHH-100GWODPT1/PA manufactured by Sakai Orbex Co., Ltd., Vf (fiber volume content): 47%
Polycarbonate CFRP Prepreg
  BHH-100GWODPT1/PC manufactured by Sakai Orbex Co., Ltd., Vf (fiber volume content): 47%
Polypropylene CFRP Prepreg
  BHH-100GWODPT1/PP manufactured by Sakai Orbex Co., Ltd., Vf (fiber volume content): 47%
[Phenoxy Resin (A)]
(A-1): Phenotote YP-50S (bisphenol A type, manufactured by Nippon Steel & Sumikin Chemical Co., Ltd., Mw=40,000, hydroxyl equivalent=284 g/eq), melt viscosity at 250° C.=90 Pa s, and Tg=83° C.
[Crosslinkable Curable Resin (B)]
Epoxy Resin
  YSLV-80XY (Tetramethylbisphenol F type, manufactured by Nippon Steel & Sumikin Chemical Co., Ltd., epoxy equivalent=192 g/eq, and melting point=72° C.)
[Crosslinking Agent (C)]
Ethylene glycol bisanhydrotrimellitate: TMEG
(Acid Anhydride Equivalent: 207, and melting point: 160° C.)

Production Example 1

[Preparation of Phenoxy Resin CFRP Prepreg A]
A powder obtained by pulverizing and classifying A-1 and having an average particle diameter D50 of 80 μm, as a phenoxy resin (A), was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg A having a thickness of 0.21 mm, an elastic modulus of 75 [GPa], a maximum load of 5100 [N], and Vf (fiber volume content) of 60% was prepared.

Production Example 2

[Preparation of Phenoxy Resin CFRP Prepreg B]
A powder obtained by pulverizing and classifying A-1 and having an average particle diameter D50 of 80 μm as a phenoxy resin (A), was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg B having a thickness of 0.65 mm, an elastic modulus of 75 [GPa], a maximum load of 13500 [N], and Vf (fiber volume content) of 60% was prepared.

Production Example 3

[Preparation of Phenoxy Resin GFRP Prepreg]

A powder obtained by pulverizing and classifying A-1 and having an average particle diameter D50 of 80 µm as a phenoxy resin (A), was powder coated to a plain woven reinforcing fiber base material made of glass fiber (cloth material: WEA 116E 106S 136 manufactured by Nitto Boseki Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin GFRP Prepreg having a thickness of 0.161 mm, an elastic modulus of 20 [GPa], a maximum load of 1470 [N], and Vf (fiber volume content) of 50% was prepared.

Production Example 4

[Preparation of Phenoxy Resin CFRP Prepreg C]

A powder obtained by pulverizing and classifying A-1 and having an average particle diameter D50 of 80 µm as a phenoxy resin (A), was powder coated to a reinforcing fiber base material made of carbon fibers (UD material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg C having a thickness of 0.3 mm, an elastic modulus of 110 [GPa], a maximum load of 13000 [N], and Vf (fiber volume content) of 46% was prepared.

Production Example 5

[Preparation of Crosslinked Phenoxy Resin CFRP Prepreg A]

100 parts by mass of A-1 as a phenoxy resin (A), 30 parts by mass of a cross-linkable curable resin (B), and 73 parts by mass of a crosslinking agent (C) were prepared, and respectively pulverized and classified to form a powder having an average particle diameter D50 of 80 µm and the resulting powder was dry-blended using a dry powder mixer (a rocking mixer manufactured by Aichi Electric Co., Ltd.). The obtained crosslinkable phenoxy resin composition was powder coated to a plain-woven reinforcing fiber base material made of carbon fibers (cloth material: SA-3203, manufactured by Sakai Orbex Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, a crosslinkable Phenoxy Resin CFRP Prepreg A having a thickness of 0.65 mm, an elastic modulus of 75 [GPa], a maximum load of 17000 [N], and a resin content (RC) of 48% was prepared.

The melt viscosity at 250° C. of the crosslinkable phenoxy resin composition was 250 Pa·s. Regarding the Tg of the phenoxy resin after cross-linking and curing, a plurality of the prepared prepregs were stacked and pressed with a press machine heated to 200° C. at 3 MPa for 3 minutes to produce a 2 mm thick CFRP laminate, and then heated at 170° C. for 30 minutes. After this post-curing, a test specimen having a width of 10 mm and a length of 10 mm was cut out with a diamond cutter. It was measured at a temperature rise of 5° C./min in the range of 25 to 250° C. using a dynamic viscoelasticity measuring device (DMA 7e manufactured by Perkin Elmer). The local maximum peak of tan 6 obtained was determined as Tg.

Production Example 6

[Preparation of Crosslinked Phenoxy Resin CFRP Prepreg B]

100 parts by mass of A-1 as a phenoxy resin (A), 30 parts by mass of a cross-linkable curable resin (B), 73 parts by mass of a crosslinking agent (C), and 120 parts by mass of the product number 181110 of CAS number #25038-54-4 manufactured by Aldrich as a nylon resin were prepared, and respectively pulverized and classified to form a powder having an average particle diameter D50 of 80 µm, and the resulting powder was dry-blended by a dry powder mixer (a rocking mixer manufactured by Aichi Electric Co., Ltd.). The resulting crosslinkable phenoxy resin composition was powder coated to a plain-woven reinforcing fiber base material made of carbon fibers (cloth material: SA-3203, manufactured by Sakai Orbex Co., Ltd.) in an electrostatic field under the conditions at a charge of 70 kV and a blowing air pressure of 0.32 MPa. Thereafter, the resin was heated and melted in an oven at 170° C. for 1 minute to thermally fuse the resin. As a result, Crosslinked Phenoxy Resin CFRP Prepreg B having a thickness of 0.65 mm, an elastic modulus of 75 [GPa], a maximum load of 18,500 [N], and a resin content (RC) of 48% was prepared.

Production Example 7

[Preparation of Phenoxy Resin Film]

Using A-1 as the phenoxy resin (A), a phenoxy resin film having a thickness of 20 µm was prepared by pressing at 3 MPa for 3 minutes using a press machine heated to 200° C.

Production Example 8

[Preparation of Resin Film of Polypropylene and Phenoxy Resin]

20 parts by mass of A-1 as a phenoxy resin (A) and 80 parts by mass of product number 427861 of CAS No. 9003-07-0 manufactured by Aldrich as a polypropylene resin were respectively crushed and classified to form a powder having an average particle diameter D50 of 80 µm. It was pressed with a press machine heated to 200° C. for 3 minutes at 3 MPa to prepare a 20 µm thick polypropylene and phenoxy resin film.

Production Example 9

[Preparation of Phenoxy Resin Film Containing Oil-Surface Bonding Adhesive]

50 parts by mass of A-1 as a phenoxy resin (A) and 50 parts by mass of a mixture of a base material and a curing agent of Alphatech 370 at a weight ratio of 100:30 as an oil-surface bonding adhesive were prepared and the resulting mixture was pressed with a press machine heated to 200° C. at 3 MPa for 3 minutes to prepare a 200 µm-thick phenoxy resin film containing an oil-surface bonding adhesive.

Production Example 10

[Preparation of Phenoxy Resin CFRP Prepreg D]

A powder obtained by pulverizing and classifying A-1 and having an average particle diameter D50 of 80 µm as a phenoxy resin (A) was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg D having a thickness of 1.00 mm, an elastic modulus of 75 [GPa], a maximum load of 19000 [N], and a Vf (fiber volume content) of 60% was prepared.

Production Example 11

[Preparation of Phenoxy Resin CFRP Prepreg E]

A powder obtained by pulverizing and classifying A-1 and having an average particle diameter D50 of 80 μm as a phenoxy resin (A) was powder coated to a reinforcing fiber base material made of carbon fiber (cloth material: IMS60, manufactured by Toho Tenax Co., Ltd.) in an electrostatic field under the conditions of a charge of 70 kV and a blowing air pressure of 0.32 MPa. Thereafter, the resin was heated and melted in an oven at 170° C. for 1 minute to thermally fuse the resin. As a result, Phenoxy Resin CFRP Prepreg E having a thickness of 1.08 mm, an elastic modulus of 75 [GPa], a maximum load of 2800 [N], and Vf (fiber volume content) of 60% was prepared.

[Metal Members]

Metal Member (M-1):
Tin-free steel plate manufactured by Nippon Steel & Sumikin Co., Ltd., 0.21 mm thick Metal Member (M-2):
Commercially available aluminum alloy A5052 plate, 0.6 mm thick Metal Member (M-3):
Pure titanium plate, manufactured by Niraco, 0.1 mm thick Metal Member (M-4):
Pure aluminum plate, manufactured by Niraco, 0.1 mm thick Metal Member (M-5):
Magnesium alloy AZ31B plate, manufactured by Nippon Metal Co., Ltd., 0.1 mm thick Metal Member (M-6):
Hot-dip galvanized steel sheet, manufactured by Nippon Steel & Sumikin Co., Ltd., 0.8 mm thick Metal Member (M-7):
Hot-dip galvanized high-strength steel sheet, manufactured by Nippon Steel & Sumikin Co., Ltd., 0.42 mm thick Example 1

A metal/CFRP composite sample for a tensile test having the structure shown in FIG. 10 was produced using M1 sufficiently degreased with acetone as the metal member 11, the Phenoxy Resin CFRP Prepreg A of Production Example 1 as the FRP layer 12, and the phenoxy resin film of Production Example 7 as the adhesive resin layer 13 by pressing them at 3 MPa for 3 minutes using a press machine heated to 250° C. The thickness of the adhesive resin layer 13 was 20 μm. After cooling, the obtained sample was subjected to a tensile test. Table 1 shows the results.

The metal member (M-1) had no adhesion of rust-preventive oil or the like on its surface and was a highly adhesive steel sheet. Therefore, even when a similar test was performed without degreasing, the super-law-of-mixture was still realized, and a result equivalent to that of Example 1 in which degreasing were performed was obtained.

Example 2

A metal/CFRP composite sample was prepared in the same manner as in Example 1 except that the phenoxy resin CFRP prepreg B of Production Example 2 was used as the FRP layer 12. The thickness of the adhesive resin layer 13 was 20 μm. After cooling, the obtained sample was subjected to a tensile test. Table 1 shows the results.

Example 3

A metal/CFRP composite sample was prepared in the same manner as in Example 2 except that M-2 sufficiently degreased with acetone was used as the metal member 11. The thickness of the adhesive resin layer 13 was 20 μm. After cooling, the obtained sample was subjected to a tensile test. Table 1 shows the results.

Example 4

A metal/CFRP composite sample was prepared in the same manner as in Example 1 except that the phenoxy resin GFRP prepreg of Production Example 3 was used as the FRP layer 12. The thickness of the adhesive resin layer 13 was 20 μm. After cooling, the obtained sample was subjected to a tensile test. Table 1 shows the results.

Example 5

A metal/CFRP composite sample was prepared in the same manner as in Example 1 except that the phenoxy resin CFRP prepreg C of Production Example 4 was used as the FRP layer 12. The thickness of the adhesive resin layer 13 was 20 μm. After cooling, the obtained sample was subjected to a tensile test. Table 1 shows the results.

Example 6

A metal/CFRP composite sample was prepared in the same manner as in Example 1 except that a polyamide CFRP prepreg of FRP prepreg was used as the FRP layer 12. The thickness of the adhesive resin layer 13 was 20 μm. After cooling, the obtained sample was subjected to a tensile test. Table 1 shows the results.

Example 7

A metal/CFRP composite sample was prepared in the same manner as in Example 1 except that a polycarbonate CFRP prepreg of FRP prepreg was used as the FRP layer 12. The thickness of the adhesive resin layer 13 was 20 μm. After cooling, the obtained sample was subjected to a tensile test. Table 1 shows the results.

Example 8

A metal/CFRP composite sample was prepared in the same manner as in Example 1 except that a polypropylene CFRP prepreg of FRP prepreg was used as the FRP layer 12. The thickness of the adhesive resin layer 13 was 20 μm. After cooling, the obtained sample was subjected to a tensile test. Table 1 shows the results.

Example 9

A metal/CFRP composite sample was prepared in the same manner as in Example 2 except that M-3 sufficiently degreased with acetone was used as the metal member 11. The thickness of the adhesive resin layer 13 was 20 μm. After cooling, the obtained sample was subjected to a tensile test. Table 1 shows the results.

Example 10

The crosslinked phenoxy resin CFRP prepreg A of Production Example 5 was used as the FRP layer 12. Further, a resin film obtained by the following steps was used as the adhesive resin layer 13. That is, 100 parts by mass of A-1 as the phenoxy resin (A), 30 parts by mass of the crosslinkable curable resin (B), and 73 parts by mass of the crosslinking agent (C) are prepared, and respectively pulverized and classified to obtain a powder having an average particle diameter D50 of 80 μm. It was dry-blended by a dry powder mixer (a rocking mixer manufactured by Aichi Electric Co., Ltd.). The obtained crosslinkable phenoxy resin composition was pressed with a press machine heated to 200° C. for 3 minutes at 3 MPa to form a resin film having a thickness of 20 μm, which was used as the adhesive resin layer 13. Except for these, a metal/CFRP composite sample was prepared in the same manner as in Example 1. The thickness of the adhesive resin layer 13 was 20 μm. After cooling, the obtained sample was subjected to a tensile test. Table 1 shows the results.

Example 11

The crosslinked phenoxy resin CFRP prepreg B of Production Example 6 was used as the FRP layer 12. Further, a resin film obtained by the following steps was used as the adhesive resin layer 13. That is, 100 parts by mass of A-1 as the phenoxy resin (A), 30 parts by mass of the crosslinkable curable resin (B), 73 parts by mass of the crosslinking agent (C), and 120 parts by mass of product number 181110 of CAS number #25038-54-4 manufactured by Aldrich as a nylon resin were prepared, and respectively pulverized and classified into a powder having an average particle diameter D50 of 80 μm. The resulting powder was dry-blended by a dry powder mixer (a rocking mixer manufactured by Aichi Electric Co., Ltd.). The obtained crosslinkable phenoxy resin composition was pressed with a press machine heated to 200° C. for 3 minutes at 3 MPa to form a resin film having a thickness of 20 μm, which was used as an adhesive resin layer. Except for these, a metal/CFRP composite sample was prepared in the same manner as in Example 1. The thickness of the adhesive resin layer 13 was 20 μm. After cooling, the obtained sample was subjected to a tensile test. Table 1 shows the results.

Example 12

A metal/CFRP composite sample was prepared in the same manner as in Example 1, except that M-7 sufficiently degreased with acetone was used as the metal member 11, the phenoxy resin CFRP prepreg D of Production Example 10 was used as the FRP layer 12, and the phenoxy resin film of Production Example 7 was used as the adhesive resin layer 13. The thickness of the adhesive resin layer 13 was 20 μm. After cooling, the obtained sample was subjected to a tensile test. Table 1 shows the results.

Example 13

A metal/CFRP composite sample was prepared in the same manner as in Example 1, except that M-7 sufficiently degreased with acetone was used as the metal member 11, the phenoxy resin CFRP prepreg E of Production Example 11 was used as the FRP layer 12, and the phenoxy resin film of Production Example 7 was used as the adhesive resin layer 13. The thickness of the adhesive resin layer 13 was 20 μm. After cooling, the obtained sample was subjected to a tensile test. Table 1 shows the results.

Example 14

A metal/CFRP composite sample was prepared in the same manner as in Example 13, except the points as follows. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metal member 11. On the surface thereof, Alphatech 370, an oil-surface bonding adhesive, manufactured by Alpha Kogyo Co., Ltd. was applied in an amount of 3/m$^2$. The thickness of the adhesive resin layer 13 was 22 μm. After cooling, the obtained sample was subjected to a tensile test. Table 1 shows the results.

Example 15

A metal/CFRP composite sample was prepared in the same manner as in Example 13, except the points as follows. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metal member 11. The phenoxy resin film containing an oil-surface bonding adhesive of Production Example 9 was used as the adhesive resin layer 13. The thickness of the adhesive resin layer 13 was 22 μm. After cooling, the obtained sample was subjected to a tensile test. Table 1 shows the results.

Comparative Example 1

As the metal member 11, a metal member prepared by cutting and polishing M-1 to a thickness of 0.032 mm (32 μm) to reduce its thickness and then degreased sufficiently with acetone was used. As the adhesive resin layer 13, a phenoxy resin CFRP prepreg C of Production Example 4, and as the adhesive resin layer 13, the phenoxy resin film of Production Example 7 were used. A metal/CFRP composite sample for a tensile test having a structure shown in FIG. 10 was produced by pressing at 3 MPa for 3 minutes with a press machine heated to 250° C. The thickness of the adhesive resin layer 13 was 20 μm. After cooling, the obtained sample was subjected to a tensile test. Table 2 shows the results.

Comparative Example 2

As the metal member 11, M-4 sufficiently degreased with acetone, as the FRP layer 12, the phenoxy resin CFRP prepreg B of Production Example 1, and as the adhesive resin layer 13, the phenoxy resin film of Production Example 7 were used. A metal/CFRP composite sample for a tensile test having a structure shown in FIG. 10 was produced by pressing at 3 MPa for 3 minutes using a press machine heated to 250° C. The thickness of the adhesive resin layer 13 was 20 μm. After cooling, the obtained sample was subjected to a tensile test. Table 2 shows the results.

Comparative Example 3

A metal/CFRP composite sample was prepared in the same manner as in Comparative Example 2, except that M-5 sufficiently degreased with acetone was used as the metal member 11. The thickness of the adhesive resin layer 13 was 20 μm. After cooling, the obtained sample was subjected to a tensile test. Table 2 shows the results.

Comparative Example 4

As the metal member 11, M-1 sufficiently degreased with acetone, as the FRP layer 12, the phenoxy resin CFRP prepreg B of Production Example 1, and as the adhesive resin layer 13, the polypropylene and phenoxy resin films of Production Example 8 were used. A metal/CFRP composite sample for a tensile test having a structure shown in FIG. 10 was prepared by pressing at 3 MPa for 3 minutes using a press machine heated to 250° C. The thickness of the adhesive resin layer 13 was 20 μm. After cooling, the obtained sample was subjected to a tensile test. Table 2 shows the results.

Comparative Example 5

A metal/CFRP composite sample was prepared in the same manner as in Example 13, except the following points. In order to quantitatively adhere the oil component to the surface of M-7 after sufficiently degreased with acetone, cup grease No. 1-3 manufactured by JX Nippon Oil Co., Ltd. was applied in an amount of 5 g/m$^2$ and the coated M-7 was used as the metal member 11. The thickness of the adhesive resin layer 13 was 20 μm. After cooling, the obtained sample was subjected to a tensile test. Table 2 shows the results.

Reference Example

A metal/CFRP composite sample was prepared in the same manner as in Comparative Example 2 except that M-2, which was not degreased, was used as the metal member 11. The thickness of the adhesive resin layer 13 was 20 μm. After cooling, the obtained sample was subjected to a tensile test. Table 2 shows the results.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| FRP Layer | Matrix Resin Type | A-1 | A-1 | A-1 | A-1 | A-1 | Nylon | Poly-carbonate | Poly-propylene |
| | Fiber Type | Car. Fib. Cloth | Car. Fib. Cloth | Car. Fib. Cloth | Glass Fib. Cloth | Car. Fib. UD | Car. Fib. UD | Car. Fib. UD | Car. Fib. UD |
| | Thickness (mm) | 0.21 | 0.65 | 0.65 | 0.162 | 0.5 | 0.5 | 0.5 | 0.5 |
| | Elastic Modulus E2 (GPa) | 75 | 75 | 75 | 20 | 110 | 110 | 110 | 110 |
| | Maximum Load B (N) | 5100 | 13500 | 13500 | 1470 | 13000 | 3000 brittle fracture | 12300 | 5000 |
| Adhesive Resin Layer | Rein Type | A-1 | A-1 | A-1 | A-1 | A-1 | A-1 | A-1 | A-1 |
| | Phenoxy Proportion (pairs of weight) | 100 | 100 | 100 | 100 | 100 | 100 | 100 | 100 |
| | Thickness (mm) | 0.02 | 0.02 | 0.02 | 0.02 | 0.02 | 0.02 | 0.02 | 0.02 |
| Metal Member | Metal Type | Soft Steel | Soft Steel | Aluminum Alloy3052 | Soft Steel | Soft Steel | Soft Steel | Soft Steel | Soft Steel |
| | Surface | TFS | TFS | none | TFS | TFS | TFS | TFS | TFS |
| | Thickness T1 (mm) | 0.21 × 2 | 0.21 × 2 | 0.6 × 2 | 0.21 × 2 | 0.22 × 2 | 0.21 × 2 | 0.22 × 2 | 0.22 × 2 |
| | Elastic Modulus E1 (GPa) | 200 | 200 | 73 | 200 | 200 | 200 | 250 | 200 |
| | Maximum Load A1 (N) | 2000 × 2 | 2000 × 2 | 3500 × 2 | 2000 × 2 | 2000 × 2 | 2000 × 2 | 2000 × 2 | 2000 × 2 |
| | Load at elongation at break of Metal/FRP Composite A2 (N) | 1800 × 2 | 1800 × 2 | 3200 × 2 | 1800 × 2 | 1800 × 2 | 1800 × 2 | 1800 × 2 | 1800 × 2 |
| Metal Peel | | No | No | No | No | No | No | No | No |
| T1 × E1/T2 × E2 | | 5.35 | 1.72 | 3.80 | 28.00 | 2.55 | 2.55 | 2.55 | 2.55 |
| Maximum Load C(N) | | 9500 | 18500 | 21000 | 6400 | 22500 | 11400 | 19800 | 11500 |
| Measures for Oil Film Problem | | Yes | Yes | Yes | Yes | Yes | Yes | Yes | Yes |
| Super-Law-of-Mixture, Criteion 1 | | Yes | Yes | Yes | Yes | Yes | Yes | Yes | Yes |
| Super-Law-of-Mixture, Criteion 2 | | Yes | Yes | Yes | Yes | Yes | Yes | Yes | Yes |
| Degree of Super-Law-of-Mixture, Criteion 1 | | 1.04 | 1.05 | 1.02 | 1.17 | 1.32 | 1.63 | 2.19 | 1.28 |
| Degree of Super-Law-of-Mixture, Criteion 2 | | 1.09 | 1.07 | 1.06 | 1.26 | 1.26 | 1.73 | 1.22 | 1.34 |

TABLE 1-continued

|  |  | Ex. 9 | Ex. 10 | Ex. 11 | Ex. 12 | Ex. 13 | Ex. 14 | Ex. 15 |
|---|---|---|---|---|---|---|---|---|
| FRP Layer | Matrix Resin Type | A-1 | Cross-linkableA | Cross-linkableB | A-1 | A-1 | A-1 | A-1 |
|  | Fiber Type | Car. Fib. Cloth | Car. Fib. Cloth | Car. Fib. Cloth | Car. Fib. Cloth | Car. Fib. Cloth | Car. Fib. Cloth | Car. Fib. Cloth |
|  | Thickness (mm) | 0.65 | 0.65 | 0.65 | 1 | 0.18 | 0.18 | 0.18 |
|  | Elastic Modulus E2 (GPa) | 75 | 75 | 75 | 75 | 75 | 75 | 75 |
|  | Maximum Load B (N) | 13500 | 17000 | 18500 | 19000 | 2800 | 2800 | 2800 |
| Adhesive Resin Layer | Rein Type | A-1 | Cross-linkableA | Cross-linkableB | A-1 | A-1 | A-1 | A-1 |
|  | Phenoxy Proportion (pairs of weight) | 100 | 80 | 50 | 100 | 100 | 100 | 50 |
|  | Thickness (mm) | 0.02 | 0.02 | 0.02 | 0.02 | 0.02 | 0.022 | 0.2 |
| Metal Member | Metal Type | Pure Ti | Soft Steel | Soft Steel | High Tensile Strength Steel | High Tensile Strength Steel | High Tensile Strength Steel | High Tensile Strength Steel |
|  | Surface | none | TFS | TFS | Hot-Dip Galvanizing | Hot-Dip Galvanizing | Hot-Dip Galvanizing | Hot-Dip Galvanizing |
|  | Thickness T1 (mm) | 0.1 × 2 | 0.21 × 2 | 0.21 × 2 | 0.42 | 0.42 | 0.42 | 0.42 |
|  | Elastic Modulus E1 (GPa) | 105 | 200 | 200 | 200 | 200 | 200 | 250 |
|  | Maximum Load A1 (N) | 900 × 2 | 2800 × 2 | 2000 × 2 | 6700 | — | — | — |
|  | Load at elongation at break of Metal/FRP Composite A2 (N) | 840 × 2 | 1800 × 2 | 1800 × 2 | 4500 | 4500 | 4500 | 4500 |
| Metal Peel |  | No | No | No | No | No | No | No |
| T1 × E1/T2 × E2 |  | 0.45 | 1.72 | 1.72 | 1.12 | 6.22 | 6.20 | 2.30 |
| Maximum Load C(N) |  | 16000 | 23500 | 25000 | 27400 | 8050 | 7820 | 7840 |
| Measures for Oil Film Problem |  | Yes | Yes | Yes | Yes | Yes | Yes | Yes |
| Super-Law-of-Mixture, Criteion 1 |  | Yes | Yes | Yes | Yes | — | — | — |
| Super-Law-of-Mixture, Criteion 2 |  | Yes | Yes | Yes | Yes | Yes | Yes | Yes |
| Degree of Super-Law-of-Mixture, Criteion 1 |  | 1.05 | 1.12 | 1.11 | 1.07 | — | — | — |
| Degree of Super-Law-of-Mixture, Criteion 2 |  | 1.05 | 1.14 | 1.13 | 1.17 | 1.1 | 1.07 | 1.07 |

TABLE 2

|  |  | Comp. Ex. 1 | Comp. Ex. 2 | Comp. Ex. 3 | Comp. Ex. 4 | Comp. Ex. 5 | Ref. Ex. |
|---|---|---|---|---|---|---|---|
| FRP Layer | Matrix Resin Type | A-1 | A-1 | A-1 | A-1 | A-1 | A-1 |
|  | Fiber Type | Car. Fib. UD | Car. Fib. Cloth | Car. Fib. Cloth | Car. Fib. Cloth | Car. Fib. Cloth | Car. Fib. Cloth |
|  | Thickness (mm) | 0.3 | 0.65 | 0.65 | 0.65 | 0.18 | 0.65 |
|  | Elastic Modulus E2 (GPa) | 110 | 75 | 75 | 75 | 75 | 75 |
|  | Maximum Load B (N) | 1300 | 13500 | 13500 | 13500 | 3000 | 13500 |
| Adhesive Resin Layer | Rein Type | A-1 | A-1 | A-1 | Propylene & A-1 | A-1 | A-1 |
|  | Phenoxy Proportion (pairs of weight) | 100 | 100 | 100 | 20 | 100 | 100 |
|  | Thickness (mm) | 0.02 | 0.02 | 0.02 | 0.02 | 0.02 | 0.02 |

TABLE 2-continued

|  |  | Comp. Ex. 1 | Comp. Ex. 2 | Comp. Ex. 3 | Comp. Ex. 4 | Comp. Ex. 5 | Ref. Ex. |
| --- | --- | --- | --- | --- | --- | --- | --- |
| Metal Member | Metal Type | Soft Steel | Pure Aluminum | Mg Alloy | Soft Steel | High Strength Steel | Aluminum Alloy 5052 |
|  | Surface | none | none | none | TFS | Hot-Dip Galvanizing | none |
|  | Thickness T1 (mm) | 0.032 | 0.1 × 2 | 0.1 × 2 | 0.21 × 2 | 0.42 | 0.6 × 2 |
|  | Elastic Modulus E1 (GPa) | 200 | 70 | 43 | 200 | 200 | 73 |
|  | Maximum Load A1 (N) | 300 × 2 | 500 × 2 | 800 × 2 | 2000 × 2 | 6700 | 3500 × 2 |
|  | Load at elongation at break of Metal/FRP Composite A2 (N) | 270 × 2 | 470 × 2 | 700 × 2 | 1800 × 2 | 4500 | 3200 × 2 |
| Metal Peel |  | Yes | Yes | Yes | Yes | Yes | Yes |
| T1 × E1/T2 × E2 |  | 0.19 | 0.18 | 0.18 | 1.72 | 6.22 | 1.80 |
| Maximum Load C(N) |  | 13600 | 14500 | 14000 | sample could not be made, steel did not adhere | 7380 | 19500 |
| Measures for Oil Film Problem |  | Yes | Yes | Yes | Yes | No | No |
| Super-Law-of-Mixture, Criteion 1 |  | No | No | No | No | No | No |
| Super-Law-of-Mixture, Criteion 2 |  | No | No | No | No | No | No |
| Degree of Super-Law-of-Mixture, Criteion 1 |  | 1.00 | 1.00 | 0.93 | — | 0.76 | 0.95 |
| Degree of Super-Law-of-Mixture, Criteion 2 |  | 1.00 | 1.00 | 0.94 | — | 0.98 | 0.98 |

As can be seen from Tables 1 and 2, Examples 1 to 15 in which a cured product of the adhesive resin composition containing 50 parts by mass or more of the phenoxy resin (A) with respect to 100 parts by mass of the resin component is provided as an adhesive resin layer, and an oil film countermeasure (degreasing or treatment by using oil-surface bonding adhesive) is provided, and the conditions of Formula (1) are satisfied, are excellent in mechanical strength as compared with Comparative Examples 1 to 3 which do not satisfy the conditions of Formula (1) and Comparative Example 4 in which an adhesive resin layer having a content of less than 50 parts by mass of the phenoxy resin (A) was provided, and Comparative Example 5 and Reference Example which were not subjected to degreasing and had extremely poor adhesion to the metal member surface. The elastic modulus E2 in Formula (1) was calculated based on the law of mixture, with the elastic modulus of the adhesive resin layer being 2 GPa. For all of the comparative examples, metal peeling occurred, and it was confirmed that metal peeling occurred regardless of the type of oil used in the comparative examples.

Although the preferred embodiments of the present invention have been described above in detail with reference to the accompanying drawings, the present invention is not limited to such examples. It is apparent that those skilled in the art to which the present invention pertains can conceive various changes or modifications within the scope of the technical thought described in the claims. It is understood that these changes and modifications also naturally belong to the technical scope of the present invention.

EXPLANATION OF SYMBOLS

1,2 metal/FRP composite
11 metal member
12 FRP layer
13,13A adhesive resin layer
20 coating
20A, 20B adhesive sheet
21 FRP molding prepreg
101 matrix resin
102 reinforcing fiber material
103 matrix resin
104 reinforcing fiber material

The invention claimed is:

1. A metal/fiber-reinforced resin material composite, comprising
    a metal member,
    a first fiber-reinforced resin material having a matrix resin and a reinforcing fiber material contained in the matrix resin,
    wherein the metal member and the first fiber-reinforced resin material are formed into a composite via an adhesive resin layer,
    wherein the adhesive resin layer contains a solidified or cured product of an adhesive resin composition containing 50 parts by mass or more of a phenoxy resin (A) with respect to 100 parts by mass of resin components,
    wherein the metal member is degreased,
    wherein the maximum load of the metal/fiber-reinforced resin material composite exhibits a super-law-of-mixture,
    wherein the super-law-of-mixture means that Formula (2-2) as described below is satisfied, $$C > A2 + B \quad (2\text{-}2)$$

wherein in Formula (2-2), the load A2 indicates a tensile load of the metal member alone at break of the metal/fiber-reinforced resin material composite, and the load B is the maximum load of the first fiber-reinforced resin material alone, and the load C is the maximum load of the metal/fiber-reinforced resin material composite.

2. The metal/fiber-reinforced resin material composite according to claim 1, wherein a degree of the super-law-of-mixture, which is a ratio of the load C to a total load of the loads A2 and B, is 1.01 or more.

3. The metal/fiber-reinforced resin material composite according to claim 2, wherein a degree of the super-law-of-mixture is 1.05 or more.

4. The metal/fiber-reinforced resin material composite according to claim 1, wherein a total thickness T1 of the metal member and an elastic modulus E1 of the metal member, and a total thickness T2 of the first fiber-reinforced resin material and the adhesive resin layer and an elastic modulus E2 of the first fiber-reinforced resin material and the adhesive resin layer satisfies the relationship of Formula (1) as described below, $$(T1 \times E1)/(T2 \times E2) > 0.3 \qquad \text{Formula (1).}$$

5. The metal/fiber-reinforced resin material composite according to claim 1, wherein the adhesive resin layer is a second fiber-reinforced resin material having the solidified or cured product as a matrix resin and a reinforcing fiber material contained in the matrix resin.

6. The metal/fiber-reinforced resin material composite according to claim 1, wherein the adhesive resin composition is a crosslinkable adhesive resin composition further comprising 5 parts by mass or more and 85 parts by mass or less of a crosslinkable curable resin (B) with respect to 100 parts by mass of the phenoxy resin (A), and the cured product is a crosslinked cured product.

7. The metal/fiber-reinforced resin material composite according to claim 1, wherein the thickness of the adhesive resin layer is more than 20 µm.

8. The metal/fiber-reinforced resin material composite according to claim 1, wherein the metal member is a steel material, an iron-based alloy, titanium or aluminum.

9. The metal/fiber-reinforced resin material composite according to claim 8, wherein the metal member is a steel material, and the steel material is a hot-dip galvanized steel sheet, an electro-galvanized steel sheet, or an aluminum-plated steel sheet.

10. The metal/fiber-reinforced resin material composite according to claim 2, wherein a total thickness T1 of the metal member and an elastic modulus E1 of the metal member, and a total thickness T2 of the first fiber-reinforced resin material and the adhesive resin layer and an elastic modulus E2 of the first fiber-reinforced resin material and the adhesive resin layer satisfies the relationship of Formula (1) as described below, $$(T1 \times E1)/(T2 \times E2) > 0.3 \qquad \text{Formula (1).}$$

11. The metal/fiber-reinforced resin material composite according to claim 3, wherein a total thickness T1 of the metal member and an elastic modulus E1 of the metal member, and a total thickness T2 of the first fiber-reinforced resin material and the adhesive resin layer and an elastic modulus E2 of the first fiber-reinforced resin material and the adhesive resin layer satisfies the relationship of Formula (1) as described below, $$(T1 \times E1)/(T2 \times E2) > 0.3 \qquad \text{Formula (1).}$$

12. The metal/fiber-reinforced resin material composite according to claim 2, wherein the adhesive resin layer is a second fiber-reinforced resin material having the solidified or cured product as a matrix resin and a reinforcing fiber material contained in the matrix resin.

13. The metal/fiber-reinforced resin material composite according to claim 3, wherein the adhesive resin layer is a second fiber-reinforced resin material having the solidified or cured product as a matrix resin and a reinforcing fiber material contained in the matrix resin.

14. The metal/fiber-reinforced resin material composite according to claim 4, wherein the adhesive resin layer is a second fiber-reinforced resin material having the solidified or cured product as a matrix resin and a reinforcing fiber material contained in the matrix resin.

15. The metal/fiber-reinforced resin material composite according to claim 2, wherein the adhesive resin composition is a crosslinkable adhesive resin composition further comprising 5 parts by mass or more and 85 parts by mass or less of a crosslinkable curable resin (B) with respect to 100 parts by mass of the phenoxy resin (A), and the cured product is a crosslinked cured product.

16. The metal/fiber-reinforced resin material composite according to claim 3, wherein the adhesive resin composition is a crosslinkable adhesive resin composition further comprising 5 parts by mass or more and 85 parts by mass or less of a crosslinkable curable resin (B) with respect to 100 parts by mass of the phenoxy resin (A), and the cured product is a crosslinked cured product.

* * * * *